(12) United States Patent
Hua et al.

(10) Patent No.: US 11,782,249 B2
(45) Date of Patent: Oct. 10, 2023

(54) OPTICAL SYSTEM, CAMERA MODULE, AND ELECTRONIC DEVICE

(71) Applicants: OFILM GROUP CO., LTD., Guangdong (CN); JIANGXI JINGCHAO OPTICAL CO., LTD., Jiangxi (CN)

(72) Inventors: Lu Hua, Guangdong (CN); Jian Yang, Guangdong (CN); Ming Li, Guangdong (CN)

(73) Assignees: OFILM GROUP CO., LTD., Shenzhen (CN); JIANGXI JINGCHAO OPTICAL CO., LTD., Nanchang (CN)

( * ) Notice: Subject to any disclaimer, the term of this patent is extended or adjusted under 35 U.S.C. 154(b) by 283 days.

(21) Appl. No.: 17/354,418

(22) Filed: Jun. 22, 2021

(65) Prior Publication Data
US 2022/0128804 A1    Apr. 28, 2022

Related U.S. Application Data

(63) Continuation of application No. PCT/CN2020/123363, filed on Oct. 23, 2020.

(51) Int. Cl.
| | | |
|---|---|---|
| *G02B 15/14* | (2006.01) | |
| *G02B 27/00* | (2006.01) | |
| *G03B 17/12* | (2021.01) | |

(52) U.S. Cl.
CPC . *G02B 15/143105* (2019.08); *G02B 27/0025* (2013.01); *G03B 17/12* (2013.01)

(58) Field of Classification Search
CPC .............. G02B 9/64; G02B 13/0045; G02B 15/143105; G02B 27/0025; G03B 17/12
See application file for complete search history.

(56) References Cited

FOREIGN PATENT DOCUMENTS

| | | |
|---|---|---|
| CN | 105137568 A | 12/2015 |
| CN | 106249387 A | 12/2016 |
| CN | 106468826 A | 3/2017 |
| CN | 111190269 A | 5/2020 |
| JP | 2018189865 A | 11/2018 |
| KR | 19990016339 A | 3/1999 |

OTHER PUBLICATIONS

The International Search Report issued in corresponding International Application No. PCT/CN2020/123363, dated Jul. 21, 2021, pp. 1-9, Beijing, China.

*Primary Examiner* — Jack Dinh
(74) *Attorney, Agent, or Firm* — HAUPTMAN HAM, LLP

(57) ABSTRACT

An optical system, a camera module, and an electronic device are provided. The optical system includes a first lens group having a positive refractive power, a second lens group having a negative refractive power, and a third lens group having a positive refractive power which are sequentially arranged from an object side to an image side along an optical axis of the optical system. The first lens group includes a first lens. The second lens group includes a second lens, a third lens, and a fourth lens. The third lens group includes a fifth lens, a sixth lens, a seventh lens, and an eighth lens. A distance between any two groups of the first lens group, the second lens group, and the third lens group is adjustable such that the optical system is operable to be at a telephoto end, an intermediate, and a wide-angle end.

20 Claims, 30 Drawing Sheets

OPTICAL SYSTEM, CAMERA MODULE, AND ELECTRONIC DEVICE

CROSS-REFERENCE TO RELATED APPLICATIONS

The present application is a continuation of International Application No. PCT/CN2020/123363, filed on Oct. 23, 2020, the disclosure of which is hereby incorporated by reference in its entirety.

TECHNICAL FIELD

The present disclosure relates to the field of optical imaging technology, and particularly to an optical system, a camera module, and an electronic device.

BACKGROUND

In recent years, electronic devices with multiple lenses have emerged, which can realize ultra-definition shooting, wide-angle shooting, and telephoto shooting by switching different lenses. Although the lens configuration of this type of electronic device meets the user's photographing requirements in different scenes, it will increase the cost of the lens, the space occupied by the lens, and thickness and weight of the electronic device, thereby affecting the user's experience. In addition, in order to achieve high imaging quality, more lenses are needed, which also increases the difficulty of lens miniaturization. As a result, the existing lens cannot meet requirements of high pixels, large zoom range, and miniaturization at the same time.

SUMMARY

An optical system, a camera module, and an electronic device are provide to solve the above technical problems.

An optical system is provided. The optical system includes a first lens group having a positive refractive power, a second lens group having a negative refractive power, and a third lens group having a positive refractive power which are sequentially arranged from an object side to an image side along an optical axis of the optical system. The first lens group includes a first lens. The second lens group includes a second lens, a third lens, and a fourth lens. The third lens group includes a fifth lens, a sixth lens, a seventh lens, and an eighth lens. A distance between any two groups of the first lens group, the second lens group, and the third lens group is adjustable such that the optical system is operable to be at a telephoto end, an intermediate, and a wide-angle end. The optical system has different focal lengths at the telephoto end, the intermediate, and the wide-angle end. The optical system satisfies the following expression: $-70<fg2/AT24<-10$, where fg2 represents a focal length of the second lens group, AT24 represents a sum of an air space along the optical axis between adjacent lenses in the second lens group. The optical system of the disclosure meets requirements of high pixels, large zoom range, and miniaturization at the same time. When the optical system satisfies the above expression, a ratio of the focal length of the second lens group (fg2) to the sum (AT24) of the air space along the optical axis between adjacent lenses in the second lens group can be reasonably set to allow the second lens group to have a shortened overall length, thereby shortening the overall length of the optical system. In addition, it is beneficial for correcting aberrations generated by front and rear lens groups, balance in aberration correction of the entire optical system is realized, and the imaging quality of the optical system is improved.

In implementations, the optical system satisfies the following expression: $fc/fd>1.3$, where fc represents the focal length of the optical system at the telephoto end, and fd represents the focal length of the optical system at the wide-angle end. When the optical system satisfies the above expression, a ratio of the focal length (fc) of the optical system at the telephoto end to the focal length (fd) of the optical system at the wide-angle end can be reasonably set to allow the optical system to obtain a higher zoom ratio, thereby achieving a larger range of shooting magnification.

In implementations, the optical system further includes a filter placed between the eighth lens and an imaging plane, and the optical system satisfies the following expression: $TTL/(D1+D2+D3)<2.6$, where TTL is a distance along the optical axis from an object-side surface of the first lens to the imaging plane of the optical system, D1 represents a distance along the optical axis from the object-side surface of the first lens to an image-side surface of the second lens, D2 represents a distance along the optical axis from an image-side surface of the fourth lens to an object-side surface of the fifth lens, and D3 represents a distance along the optical axis from an image-side surface of the filter to the imaging plane. When the optical system satisfies the above expression, a ratio of an overall length of the optical system to a sum of D1, D2, and D3 can be reasonably set to shorten the overall length of the optical system and increase the zoom range.

In implementations, the optical system satisfies the following expression: $(g1+g2+g3)/fd<0.9$, where g1 represents a distance along the optical axis from an object-side surface of the first lens to an image-side surface of the first lens, g2 represents a distance along the optical axis from an object-side surface of the second lens to an image-side surface of the fourth lens, g3 represents a distance along the optical axis from an object-side surface of the fifth lens to an image-side surface of the seventh lens, and fd represents the focal length of the optical system at the wide-angle end. When the optical system satisfies the above expression, a ratio of a sum of the overall length of each lens group to the focal length of the optical system at the wide-angle end can be reasonably set to realize the miniaturization of lens and broaden the zoom range of the optical system in the wide-angle direction.

In implementations, the optical system satisfies the following expression: $FNOc/FNOd<1.6$, where FNOc represents an F-number of the optical system at the telephoto end, and FNOd is the F-number of the optical system at the wide-angle end. When the optical system satisfies the above expression, sufficient luminous flux can be ensured in both telephoto and wide-angle landscapes, and the optical system can perform high-definition imaging.

In implementations, the optical system satisfies the following expression: $1<fg1/fc<8$, where fg1 represents a focal length of the first lens group, and fc represents the focal length of the optical system at the telephoto end. When the optical system satisfies the above expression, a ratio of the focal length (fg1) of the first lens group to the focal length (fc) of the optical system at the telephoto end can be reasonably set to allow the optical system to obtain a wide zoom range in the telephoto direction. At the same time, proper optical power is assigned to the first lens group, it is helpful to correct distortion and spherical aberration, and further improve system resolution.

In implementations, the optical system satisfies the following expression: $0.8<fg3/|R15-R16|<1.5$, where fg3 represents a focal length of the third lens group, R15 represents a curvature radius along the optical axis of an object-side surface of the eighth lens, R16 represents a curvature radius along the optical axis of an image-side surface of the eighth lens. When the optical system satisfies the above expression, a ratio of fg3 to the difference between R15 and R16 can be reasonably set to allow light to pass through the filter at a more reasonable angle to the imaging plane, high relative illuminance can be obtained. In addition, it can prevent the object-side surface and the image-side surface of the eighth lens from being excessively curved, excessive light deflection angle is avoided, and the processing difficulty of the eighth lens can also be reduced.

In implementations, the optical system satisfies the following expression: $1<f3/fg2<5$, where f3 represents a focal length of the third lens, and fg2 represents the focal length of the second lens group. When the optical system satisfies the above expression, appropriate optical power can be by assigned to the third lens, to allow the second lens group has shortened overall length and the second lens group to have an improved correction ability in the spherical aberration generated by the front and rear lens groups, thereby improving the image quality.

In implementations, the optical system satisfies the following expression: sdmax/sdmin<1.55, where sdmax represents a maximum value of maximum effective radiuses of an object-side surface and an image-side surface of each one of the first to eighth lenses, and sdmin represents a minimum value of maximum effective radiuses of the object-side surface and the image-side surface of each one of the first to eighth lenses. When the optical system satisfies the above expression, a ratio of sdmax to sdmin can be reasonably set, on the one hand, it is beneficial to ensuring that light is deflected by an angle within a reasonable range, on the other hand, it helps to allow the lens to have a reasonable size, improve the processing stability of the optical system, and lower the sensitivity.

In implementations, the optical system satisfies the following expression: $1.2<g2/\Sigma\ etg2<1.8$, where g2 represents a distance along the optical axis from an object-side surface of the second lens to an image-side surface of the fourth lens, and $\Sigma etg2$ represents a sum of an edge thickness of each lens element in the second lens group. When the optical system satisfies the above expression, a ratio of g2 to etg2 can be reasonably set to allow the optical system to have a shortened overall length and realize the miniaturization of the optical system. In addition, it can ensure that the second lens group has a uniform thickness at the center and the edges, and the processing difficulty of the second lens group is reduced.

In implementations, the optical system satisfies the following expression: BFc/ImgH<3.5, where BFc represents a minimum distance along the optical axis from an image-side surface of the eighth lens to an imaging plane when the optical system is at the telephoto end, and ImgH represents half of a diagonal length of an effective pixel region of the imaging plane. When the optical system satisfies the above expression, a ratio of a back focus to a half image height of the optical system can be reasonably set to ensure good matching with the electronic photosensitive chip, as well as facilitate the realization of the telephoto characteristics of the optical system.

In implementations, the optical system satisfies the following expression: 2.5<sag82/sag81<3.5, where sag81 represents a sag at a maximum effective radius of an object-side surface of the eighth lens, and sag82 represents a sag at a maximum effective radius of an image-side surface of the eighth lens. When the optical system satisfies the above expression, a ratio of sag82 to sag81 can be set within a reasonable range, such that the object-side surface and the image-side surface of the eighth lens can obtain a reasonable surface shape. As such, on the one hand, an aberration generated by a front lens group can be corrected and the light can be controlled to reach the imaging plane with a small deflection angle, on the other hand, the processing difficulty of the eighth lens can be reduced.

A camera module is provided. The camera module comprises a lens barrel, an electronic photosensitive element, and the above-mentioned optical system, the first to eighth lenses of the optical system are mounted in the lens barrel. The electronic photosensitive element is disposed at the image side of the optical system and used to convert light passing through the first to eighth lenses and incident on the electronic photosensitive element into an electrical signal of an image. In the present disclosure, the first to eighth lenses of the optical system are installed in the camera module, a surface shape and refractive power of each lens of the first to eighth lenses are reasonably set. As such, the camera module can meet requirements of high pixels, large zoom range, and miniaturization at the same time.

An electronic device is provided. The electronic device includes a housing and the above-mentioned camera module, and the camera module is received in the housing. In the present disclosure, the above-mentioned camera module is installed in the electronic device, such that the electronic device can meet requirements of high pixels, large zoom range, and miniaturization at the same time.

BRIEF DESCRIPTION OF THE DRAWINGS

To describe the technical solutions in the implementations of the present disclosure or the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

FIG. 1b illustrates a longitudinal spherical aberration curve, an astigmatic field curve, and a distortion curve of the optical system at the wide-angle end of FIG. 1a.

FIG. 2b illustrates a longitudinal spherical aberration curve, an astigmatic field curve, and a distortion curve of the optical system at the wide-angle end of FIG. 2a.

FIG. 3b illustrates a longitudinal spherical aberration curve, an astigmatic field curve, and a distortion curve of the optical system at the wide-angle end of FIG. 3a.

FIG. 4b illustrates a longitudinal spherical aberration curve, an astigmatic field curve, and a distortion curve of the optical system at the wide-angle end of FIG. 4a.

FIG. 5b illustrates a longitudinal spherical aberration curve, an astigmatic field curve, and a distortion curve of the optical system at the wide-angle end of FIG. 5a.

DETAILED DESCRIPTION OF ILLUSTRATED IMPLEMENTATIONS

Figure 1A:
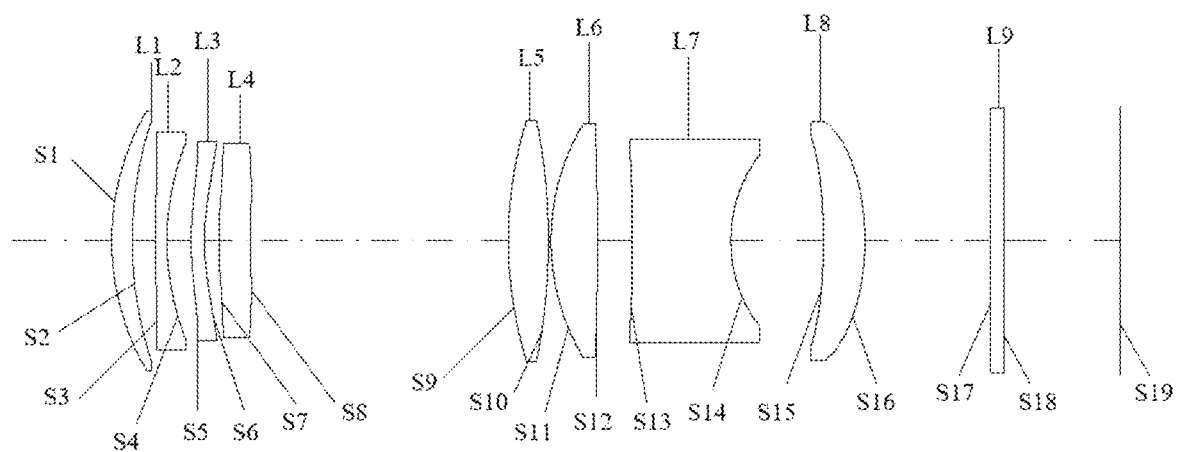
FIG. 1a is a schematic structural view of an optical system at a wide-angle end according an implementation.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

A camera module is provided. The camera module includes a lens barrel, an electronic photosensitive element, and an optical system provided in implementations of the disclosure. First to eighth lenses of the optical system are installed in the lens barrel. The electronic photosensitive element is disposed at an image side of the optical system and used to convert light passing through the first to eighth lenses and incident on the electronic photosensitive element into an electrical signal of an image. The electronic photosensitive element may be a complementary metal oxide semiconductor (CMOS) or a charge-coupled device (CCD). The camera module can be an independent lens of a digital camera or an imaging module integrated on an electronic device such as a smart phone. In the present disclosure, the first to eighth lenses of the optical system are installed in the camera module, a surface shape and refractive power of each lens of the first to eighth lenses are reasonably set, such that the camera module can meet requirements of high pixels, large zoom range, and miniaturization at the same time.

An electronic device is provided. The electronic device includes a housing and the camera module provided in implementations of the disclosure. The camera module and the electronic photosensitive element are received in the housing. The electronic device can be a smart phone, a personal digital assistant (PDA), a tablet computer, a smart watch, a drone, an e-book reader, a driving recorder, a wearable device, etc. In the present disclosure, the camera module is installed in the electronic device, such that the electronic device can meet requirements of high pixels, large zoom range, and miniaturization at the same time.

An optical system is provided according to implementations of the present disclosure. The optical system includes a first lens group having a positive refractive power, a second lens group having a negative refractive power, and a third lens group having a positive refractive power which are sequentially arranged from an object side to an image side along an optical axis of the optical system. The first lens group includes a first lens. The second lens group includes a second lens, a third lens, and a fourth lens. The third lens group includes a fifth lens, a sixth lens, a seventh lens, and an eighth lens. There is an air gap between adjacent ones of the first to eighth lenses.

A distance between any two groups of the first lens group, the second lens group, and the third lens group is adjustable such that the optical system is operable to be at a telephoto end, an intermediate (also known as a medium telephoto end), and a wide-angle end. The optical system has different focal lengths at the telephoto end, the intermediate, and the wide-angle end.

Rationally settings of the refractive power of each of the first lens group, the second lens group, and the third lens group and a distance between each two adjacent ones of the first lens group, the second lens group, and the third lens group are provided by implementations of the disclosure, such that the optical system meets the requirements of high pixels, large zoom range, and miniaturization at the same time.

It is noted that, when zooming from the wide-angle end to the telephoto end, the first lens group and the imaging plane remain stationary, a distance between the first lens group and the second lens group and a distance between the third lens group and the imaging plane increase, and the optical system includes at least one aspherical plastic lens.

In an implementation, the optical system satisfies the following expression: $-70 < fg2/AT24 < -10$, where $fg2$ represents a focal length of the second lens group, $AT24$ represents a sum of an air space along the optical axis between adjacent lenses in the second lens group. When the optical system satisfies the above expression, a ratio of the focal length of the second lens group ($fg2$) to the sum (AT24) of the air space along the optical axis between each two adjacent lenses of the second lens group can be reasonably set to allow the second lens group to have a shortened overall length, thereby shortening the overall length of the optical system. In addition, it is beneficial for correcting aberrations generated by front and rear lens groups, balance in aberration correction of the entire optical system is realized, and the imaging quality of the optical system is improved. When fg2/AT24-70, the sum of the air space along the optical axis between adjacent lenses in the second lens group is excessively small, which is easy to cause collision of the lenses and thus is not conducive to processing and assembly. When fg2/AT24≥−10, the negative refractive power assumed by the second lens group is excessively large, which is not conducive to aberration correction and overall balance, and it is easy to cause image quality degradation.

In an implementation, the optical system satisfies the following expression: fc/fd>1.3, where fc represents the focal length of the optical system at the telephoto end, and fd represents the focal length of the optical system at the wide-angle end. When the optical system satisfies the above expression, a ratio of the focal length (fc) of the optical system at the telephoto end to the focal length (fd) of the optical system at the wide-angle end can be rationally set to allow the optical system to obtain a higher zoom ratio, thereby achieving a larger range of shooting magnification. When fc/fd≤1.3, the zoom range is too small to provide good shooting experience.

In implementations, the optical system further includes a filter placed between the eighth lens and an imaging plane, and the optical system satisfies the following expression: TTL/(D1+D2+D3)<2.6, where TTL is a distance along the optical axis from an object-side surface of the first lens to the imaging plane of the optical system, D1 represents a distance along the optical axis from the object-side surface of the first lens to an image-side surface of the second lens, D2 represents a distance along the optical axis from an image-side surface of the fourth lens to an object-side surface of the fifth lens, and D3 represents a distance along the optical axis from an image-side surface of the filter to the imaging plane. When the optical system satisfies the above expression, a ratio of an overall length of the optical system to a sum of D1, D2, and D3 can be rationally set to shorten the overall length of the optical system and increase the zoom range. When TTL/(D1+D2+D3)≥2.6, the sum of D1, D2, and D3 is excessively small, which is not beneficial for assembly, and the processing difficulty is increased.

In an implementation, the optical system satisfies the following expression: (g1+g2+g3)/fd<0.9, where g1 represents a distance along the optical axis from an object-side surface of the first lens to an image-side surface of the first lens, g2 represents a distance along the optical axis from an object-side surface of the second lens to an image-side surface of the fourth lens, g3 represents a distance along the optical axis from an object-side surface of the fifth lens to an image-side surface of the seventh lens, and fd represents the focal length of the optical system at the wide-angle end. When the optical system satisfies the above expression, a ratio of a sum of the overall length of each lens group to the focal length of the optical system at the wide-angle end can be reasonably set to realize the miniaturization of lens and broaden the zoom range of the optical system in the wide-angle direction. When (g1+g2+g3)/fd≥0.9, the sum of the overall length of each lens group is excessively large, which is not conducive to correcting aberrations and shortening the overall length of the optical system.

In an implementation, the optical system satisfies the following expression: FNOc/FNOd<1.6, where FNOc represents an F-number of the optical system at the telephoto end, and FNOd is the F-number of the optical system at the wide-angle end. When the optical system satisfies the above expression, it can ensure that sufficient luminous flux can be obtained in both telephoto and wide-angle landscapes, and the optical system can perform high-definition imaging. When FNOc/FNOd≥1.6, the difference between the F-number of the optical system at the telephoto end and the F-number of the optical system at the wide-angle end is excessively large, which may cause an unstable image quality during zoom shooting and degrade quality of the user experience.

In an implementation, the optical system satisfies the following expression: 1<fg1/fc<8, where fg1 represents a focal length of the first lens group, and fc represents the focal length of the optical system at the telephoto end. When the optical system satisfies the above expression, a ratio of the focal length (fg1) of the first lens group to the focal length (fc) of the optical system at the telephoto end can be reasonably set to allow the optical system to obtain a wide zoom range in the telephoto direction. At the same time, proper optical power is assigned to the first lens group, it is helpful to correct distortion and spherical aberration, and further improve system resolution.

In an implementation, the optical system satisfies the following expression: 0.8<fg3/|R15-R16|<1.5, where fg3 represents a focal length of the third lens group, R15 represents a curvature radius along the optical axis of an object-side surface of the eighth lens, R16 represents a curvature radius along the optical axis of an image-side surface of the eighth lens. When the optical system satisfies the above expression, a ratio of fg3 to the difference between R15 and R16 can be reasonably set to allow light to pass through the filter at a more reasonable angle to the imaging plane, high relative illuminance can be obtained. In addition, it can prevent the object-side surface and the image-side surface of the eighth lens from being excessively curved, excessive light deflection angle is avoided, and the processing difficulty of the eighth lens can also be reduced.

In an implementation, the optical system satisfies the following expression: 1<f3/fg2<5, where f3 represents a focal length of the third lens, and fg2 represents the focal length of the second lens group. When the optical system satisfies the above expression, appropriate optical power can be by assigned to the third lens, to allow the second lens group has shortened overall length and the second lens group to have an improved correction ability in the spherical aberration generated by the front and rear lens groups, thereby improving the image quality.

In an implementation, the optical system satisfies the following expression: sdmax/sdmin<1.55, where sdmax represents a maximum value of maximum effective radiuses of an object-side surface and an image-side surface of each one of the first to eighth lenses, and sdmin represents a minimum value of maximum effective radiuses of the object-side surface and the image-side surface of each one of the first to eighth lenses. When the optical system satisfies the above expression, a ratio of sdmax to sdmin can be reasonably set, on the one hand, it is beneficial to ensuring that light is deflected by an angle within a reasonable range, on the other hand, it helps to allow the lens to have a reasonable size, improve the processing stability of the optical system, and lower the sensitivity. When sdmax/sdmin≥1.55, there is an uneven distribution in diameters of the lenses, which easily causes an excessively large light deflection angle and affects the image quality.

In an implementation, the optical system satisfies the following expression: $1.2<g2/\Sigma etg2<1.8$, where g2 represents a distance along the optical axis from an object-side surface of the second lens to an image-side surface of the fourth lens, and $\Sigma etg2$ represents a sum of an edge thickness of each lens element in the second lens group. When the optical system satisfies the above expression, a ratio of g2 to etg2 can be reasonably set to allow the optical system to have a shortened overall length and realize the miniaturization of the optical system. In addition, it can ensure that the second lens group has a uniform thickness at the center and the edges, and the processing difficulty of the second lens group is reduced. When $g2/E\ etg2\geq1.8$ or $g2/\Sigma etg2\leq1.2$, there is an excessively large difference between the edge thickness of each lens element in the second lens group lens and the center thickness, and a relatively thin portion of each lens is easily squeezed and damaged, resulting in waste of materials and reduced image quality.

In an implementation, the optical system satisfies the following expression: $BFc/ImgH<3.5$, where BFc represents a minimum distance along the optical axis from an image-side surface of the eighth lens to an imaging plane when the optical system is at the telephoto end. ImgH represents half of a diagonal length of an effective pixel region of the imaging plane. When the optical system satisfies the above expression, a ratio of a back focus to a half image height of the optical system can be reasonably set to ensure good matching with the electronic photosensitive chip, as well as facilitate the realization of the telephoto characteristics of the optical system.

In an implementation, the optical system satisfies the following expression: $2.5<sag82/sag81<3.5$, where sag81 represents a sag at a maximum effective radius of an object-side surface of the eighth lens, and sag82 represents a sag at a maximum effective radius of an image-side surface of the eighth lens. When the optical system satisfies the above expression, a ratio of sag82 to sag81 can be set within a reasonable range, such that the object-side surface and the image-side surface of the eighth lens can obtain a reasonable surface shape. As such, on the one hand, an aberration generated by a front lens group can be corrected and the light can be controlled to reach the imaging plane with a small deflection angle, on the other hand, the processing difficulty of the eighth lens can be reduced. When $sag82/sag81\geq3.5$, the eighth lens has an excessive curvature, resulting in an increased difficulty in processing and molding. When $sag82/sag81\leq2.5$, the eighth lens has a gentle curvature, which is not conducive to aberration correction, and the resolution will also be reduced.

Referring to FIGS. 1a to 1f, the optical system of the disclosure includes a first lens L1, a second lens L2, a third lens L3, a fourth lens L4, a fifth lens L5, a sixth lens L6, a seventh lens L7, and an eighth lens L8 which are sequentially arranged from the object side to the image side along the optical axis of the optical system.

The first lens L1 has a positive refractive power. The object-side surface S1 of the first lens L1 is convex near the optical axis and is convex at a circumference. The image-side surface S2 of the first lens L1 is concave near the optical axis and is concave at a circumference.

The second lens L2 has a negative refractive power. The object-side surface S3 of the second lens L2 is convex near the optical axis and is convex at a circumference. The image-side surface S4 of the second lens L2 is concave near the optical axis and is concave at a circumference.

The third lens L3 has a negative refractive power. The object-side surface S5 of the third lens L3 is convex near the optical axis and is concave at a circumference. The image-side surface S6 of the third lens L3 is concave near the optical axis and is convex at a circumference.

The fourth lens L4 has a positive refractive power. The object-side surface S7 of the fourth lens L4 is convex near the optical axis and is concave at a circumference. The image-side surface S8 of the fourth lens L4 is concave near the optical axis and is convex at a circumference.

The fifth lens L5 has a positive refractive power. The object-side surface S9 of the fifth lens L5 is convex near the optical axis and is convex at a circumference. The image-side surface S10 of the fifth lens L5 is convex near the optical axis and is convex at a circumference.

The sixth lens L6 has a positive refractive power. The object-side surface S11 of the sixth lens L6 is convex near the optical axis and is convex at a circumference. The image-side surface S12 of the sixth lens L6 is convex near the optical axis and is convex at a circumference.

The seventh lens L7 has a negative refractive power. The object-side surface S13 of the seventh lens L7 is concave near the optical axis and is concave at a circumference. The image-side surface S14 of the seventh lens L7 is concave near the optical axis and is concave at a circumference.

The eighth lens L8 has a positive refractive power. The object-side surface S15 of the eighth lens L8 is concave near the optical axis and is concave at a circumference. The image-side surface S16 of the eighth lens L8 is convex near the optical axis and is convex at a circumference.

In an implementation, each lens of the first to eighth lenses (L1 to L8) is made of plastic or glass. In another implementation, at least one lens of the first to the eighth lenses (L1 to L8) is made of plastic.

In addition, the optical system further includes an aperture stop (STO), an infrared cut-off filter L9, and the imaging plane S19. The aperture stop STO is disposed between the fourth lens L4 and the fifth lens L5 to control the amount of light entering the lens. In other implementations, the aperture stop STO can also be disposed between two other adjacent lenses, or on other lens. The infrared cut-off filter L9 is disposed at an image side of the eighth lens L8 and has an object-side surface S17 and an image-side surface S18. The infrared cut-off filter L9 is used to filter out infrared light so that the light entering the imaging plane S19 is visible light, and the wavelength of visible light is 380 nm-780 nm. The infrared cut-off filter L9 is made of glass and can be coated thereon. The imaging plane S19 is a plane where light reflected by a subject travels through the optical system to form an image.

Table 1a(1) and Table 1a(2) show characteristics of the optical system in this implementation. Each of Y radius, thickness, and focal length is in units of millimeter (mm). The focal length is evaluated at a reference wavelength of 555 nm, a refractive index and an Abbe number is evaluated at a reference wavelength of 587.56 nm.

TABLE 1a (1)

Figure 1B:
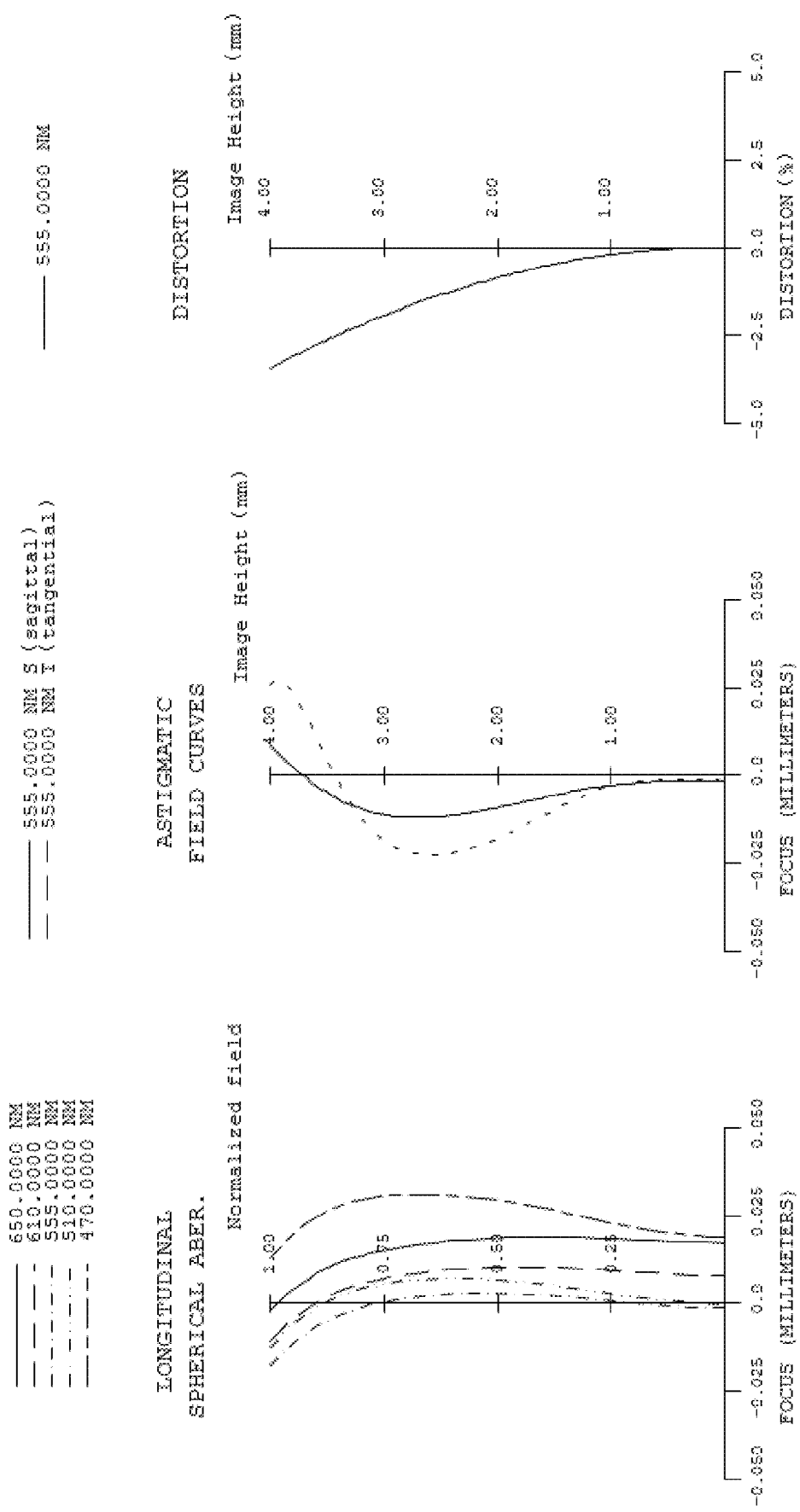
Figure 1C:
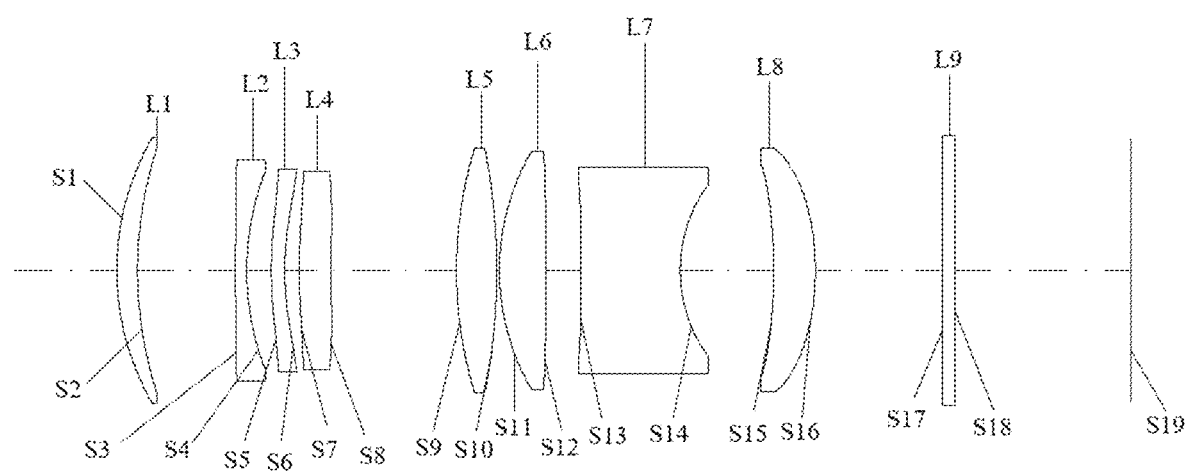
FIG. 1c is a schematic structural view of the optical system at an intermediate according to an implementation.
Figure 1D:
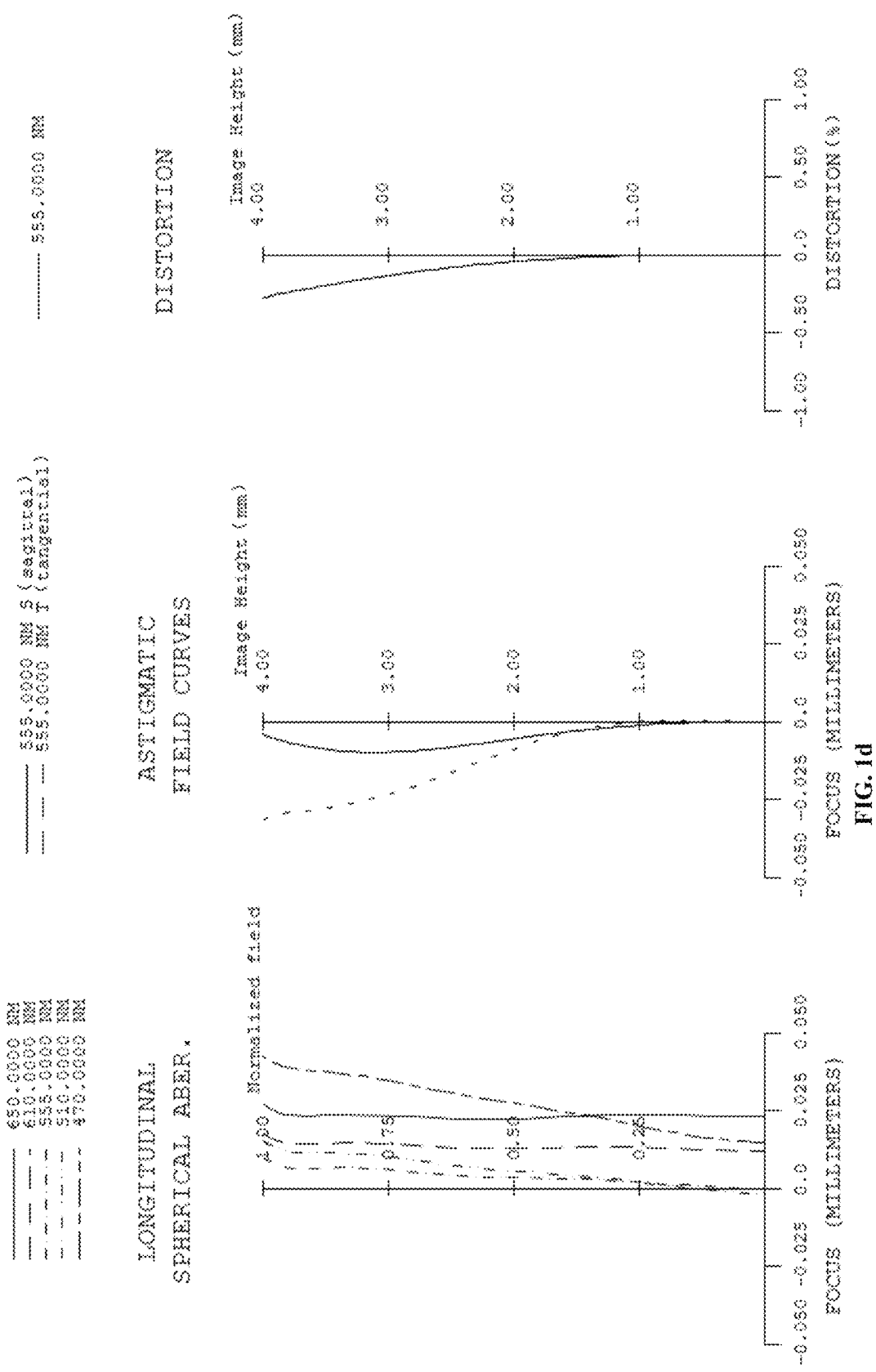
FIG. 1d illustrates a longitudinal spherical aberration curve, an astigmatic field curve, and a distortion curve of the optical system at the intermediate of FIG. 1c.
Figure 1E:
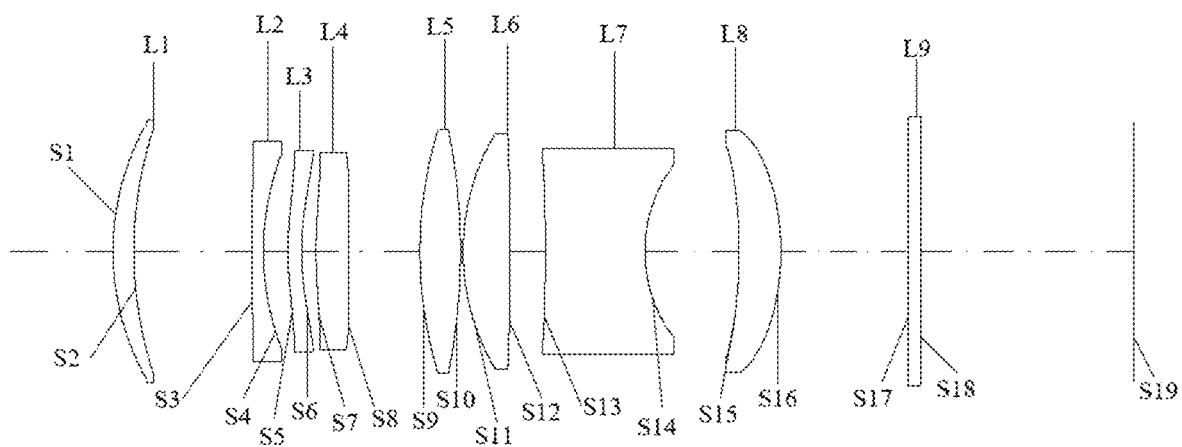
FIG. 1e is a schematic structural view of the optical system at a telephoto end according to an implementation.

Optical system illustrated in FIGS. 1a, 1c, and 1e
TTL = 32 mm

| Surface Number | Surface Name | Shape | Y Radius | Thickness | Material | Refractive Index | Abbe Number | Focal Length |
|---|---|---|---|---|---|---|---|---|
| Object surface | Object surface | Spherical | Infinity | Infinity | | | | |
| S1 | First lens | Aspherical | 8.1799 | 0.6531 | Glass | 1.487 | 70.40 | 47.970317 |
| S2 | | Spherical | 12.2514 | D1 | | | | |
| S3 | Second lens | Spherical | 146.8260 | 0.3540 | Glass | 1.744 | 50.77 | −12.053891 |
| S4 | | Spherical | 8.4462 | 0.7718 | | | | |
| S5 | Third lens | Aspherical | 11.2302 | 0.4214 | Plastic | 1.535 | 55.75 | −55.942072 |
| S6 | | Aspherical | 8.0593 | 0.4606 | | | | |
| S7 | Fourth lens | Aspherical | 17.4289 | 1.0139 | Plastic | 1.671 | 19.24 | 35.747302 |
| S8(stop) | | Aspherical | 62.1815 | D2 | | | | |
| S9 | Fifth lens | Spherical | 12.9855 | 1.2722 | Plastic | 1.535 | 55.75 | 14.700394 |
| S10 | | Spherical | −19.2626 | 0.0809 | | | | |
| S11 | Sixth lens | Spherical | 7.2562 | 1.4793 | Glass | 1.573 | 57.76 | 11.801052 |
| S12 | | Spherical | −90.7465 | 1.1000 | | | | |
| S13 | Seventh lens | Aspherical | −88.3890 | 3.1255 | Plastic | 1.671 | 19.24 | −6.439486 |
| S14 | | Aspherical | 4.6099 | 2.9425 | | | | |
| S15 | Eighth lens | Aspherical | −17.9359 | 1.3175 | Plastic | 1.671 | 19.24 | 20.994243 |
| S16 | | Aspherical | −8.1252 | 4.0000 | | | | |
| S17 | Infrared cut-off filter | Spherical | Infinity | 0.4000 | Glass | 1.517 | 64.17 | |
| S18 | | Spherical | Infinity | D3 | | | | |
| S19 | Imaging plane | Spherical | Infinity | 0.0000 | | | | |

TABLE 1a (2)

| Variable Distance | D1 | D2 | D3 | f (mm) | FNO | FOV (°) |
|---|---|---|---|---|---|---|
| Telephoto end position | 0.7500 | 8.1673 | 3.6999 | 12.9 | 2.90 | 17.8 |
| Intermediate position | 3.0901 | 3.9459 | 5.5611 | 17.5 | 3.31 | 12.9 |
| Wide-angle position | 3.7074 | 2.2386 | 6.6712 | 20.1 | 3.73 | 11.2 | f represents the focal length of the optical system. FNO represents the F-number of the optical system. FOV is a field angle of the optical system. TTL represents a distance along the optical axis from the object-side surface of the first lens to the imaging plane of the optical system.

In this implementation, the object-side surface and the image-side surface of each of the third lens L3, the fourth lens L4, the seventh lens L7, and the eighth lens L8 are aspherical. A surface shape of each aspherical lens can be defined by but not limited to the following aspherical formula:

$$x = \frac{ch^2}{1 + \sqrt{1 - (k+1)c^2h^2}} + \sum A_i h^i$$

x represents a distance (sag) along the optical axis from a vertex of the aspherical surface to a position on the aspherical surface at a height h. c represents the paraxial curvature of the aspherical surface, and is the inverse of the Y radius (that is, c=1/R, where R represents the Y radius in the table 1a(1)). k represents the conic coefficient. Ai represents the i-th order correction coefficient of the aspherical surface. Table 1b shows higher-order coefficients A4, A6, A8, A10, A12, A14, A16, A18, and A20 of each of aspherical lens surfaces S1 to S14 of the optical system illustrated in FIGS. 1a, 1c, and 1e.

TABLE 1b

| Surface Number | K | A4 | A6 | A8 | A10 | A12 | A14 | A16 | A18 | A20 |
|---|---|---|---|---|---|---|---|---|---|---|
| S5 | 4.29E+00 | −3.03E−03 | 1.00E−05 | 0.00E+00 | 0.00E+00 | 0.00E+00 | 0.00E+00 | 0.00E+00 | 0.00E+00 | 0.00E+00 |
| S6 | 2.74E+00 | −3.79E−03 | 8.00E−05 | −1.00E−05 | 0.00E+00 | 0.00E+00 | 0.00E+00 | 0.00E+00 | 0.00E+00 | 0.00E+00 |
| S7 | 1.34E+01 | −2.04E−03 | 7.00E−05 | −1.00E−05 | 0.00E+00 | 0.00E+00 | 0.00E+00 | 0.00E+00 | 0.00E+00 | 0.00E+00 |
| S8 | 2.44E+01 | −1.56E−03 | 3.00E−05 | 0.00E+00 | 0.00E+00 | 0.00E+00 | 0.00E+00 | 0.00E+00 | 0.00E+00 | 0.00E+00 |
| S13 | 0.00E+00 | −5.50E−04 | 1.00E−05 | 0.00E+00 | 0.00E+00 | 0.00E+00 | 0.00E+00 | 0.00E+00 | 0.00E+00 | 0.00E+00 |
| S14 | 0.00E+00 | 3.10E−04 | 1.00E−05 | 0.00E+00 | 0.00E+00 | 0.00E+00 | 0.00E+00 | 0.00E+00 | 0.00E+00 | 0.00E+00 |
| S15 | −1.34E+01 | −5.10E−04 | −3.00E−05 | 0.00E+00 | 0.00E+00 | 0.00E+00 | 0.00E+00 | 0.00E+00 | 0.00E+00 | 0.00E+00 |
| S16 | 2.92E+00 | 2.10E−04 | −2.00E−05 | 0.00E+00 | 0.00E+00 | 0.00E+00 | 0.00E+00 | 0.00E+00 | 0.00E+00 | 0.00E+00 |

FIG. 1a is a schematic structural view of the optical system at the wide-angle end according an implementation. FIG. 1b illustrates a longitudinal spherical aberration curve, an astigmatic field curve, and a distortion curve of the optical system at the wide-angle end of FIG. 1a. The longitudinal spherical aberration curve represents a focus deviation of each of light rays with different wavelengths after passing through each lens of the optical system. The astigmatic field curve represents tangential image surface curvature and sagittal image surface curvature. The distortion curve represents magnitudes of distortions corresponding to different field angles. As illustrated in FIG. 1b, it is clear that the optical system illustrated in FIGS. 1a, 1c, and 1e can achieve good imaging quality.

FIG. 1c is a schematic structural view of the optical system at an intermediate according to an implementation. FIG. 1d illustrates a longitudinal spherical aberration curve, an astigmatic field curve, and a distortion curve of the optical system at the intermediate of FIG. 1c. The longitudinal spherical aberration curve represents a focus deviation of each of light rays with different wavelengths after passing through each lens of the optical system. The astigmatic field curve represents tangential image surface curvature and sagittal image surface curvature. The distortion curve represents magnitudes of distortions corresponding to different field angles. As illustrated in FIG. 1d, it is clear that the optical system illustrated in FIGS. 1a, 1c, and 1e can achieve good imaging quality.

Figure 1F:
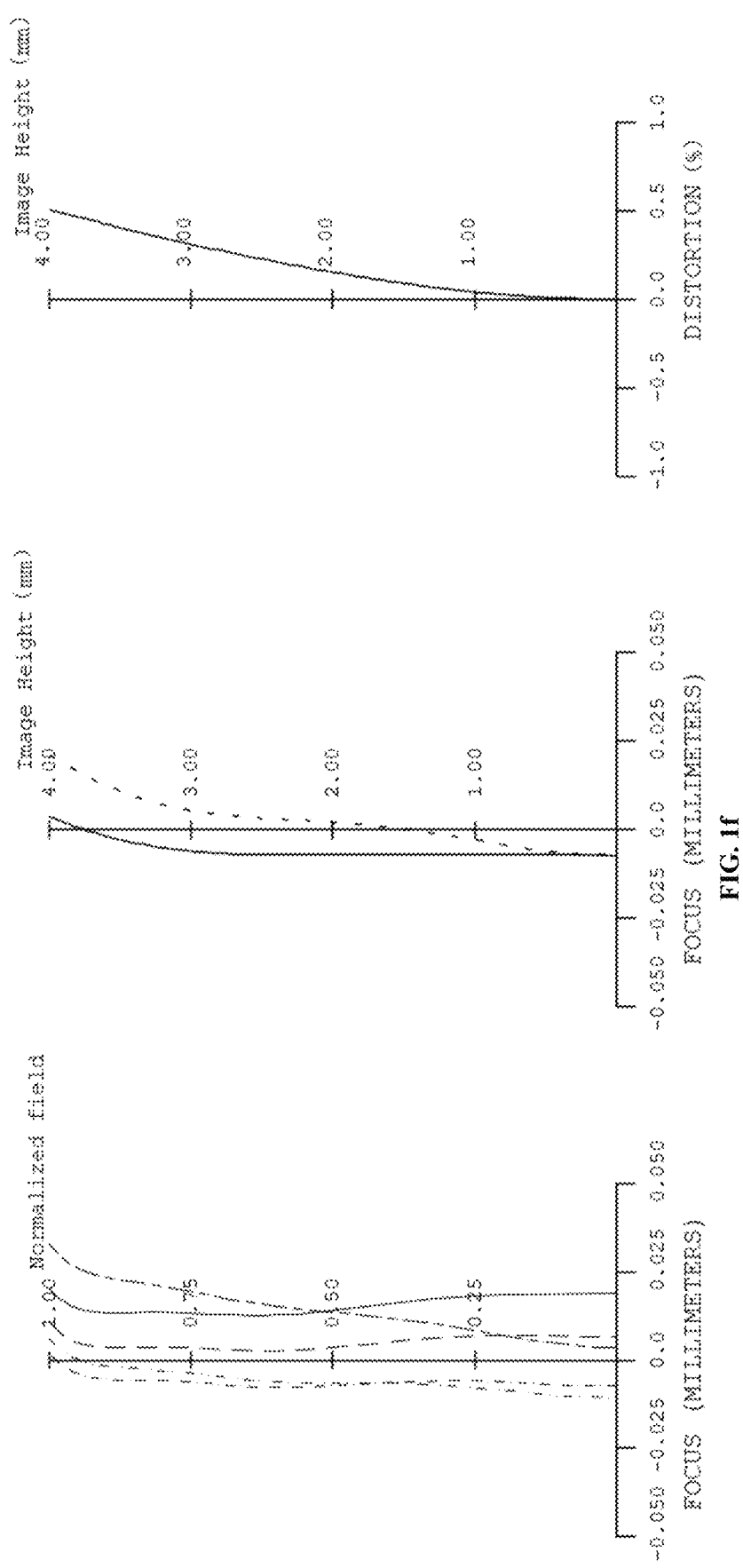
FIG. 1f illustrates a longitudinal spherical aberration curve, an astigmatic field curve, and a distortion curve the optical system at the telephoto end of FIG. 1e.

FIG. 1e is a schematic structural view of the optical system at the telephoto end according to an implementation. FIG. if illustrates a longitudinal spherical aberration curve, an astigmatic field curve, and a distortion curve the optical system at the telephoto end of FIG. 1e. The longitudinal spherical aberration curve represents a focus deviation of each of light rays with different wavelengths after passing through each lens of the optical system. The astigmatic field curve represents tangential image surface curvature and sagittal image surface curvature. The distortion curve represents magnitudes of distortions corresponding to different field angles. As illustrated in FIG. 1f, the optical system illustrated in FIGS. 1a, 1c, and 1e can achieve good imaging quality.

Referring to FIGS. 2a to 2f, the optical system in this implementation includes a first lens L1, a second lens L2, a third lens L3, a fourth lens L4, a fifth lens L5, a sixth lens L6, a seventh lens L7, and an eighth lens L8 which are sequentially arranged from the object side to the image side along the optical axis of the optical system.

The first lens L1 has a positive refractive power. The object-side surface S1 of the first lens L1 is convex near the optical axis and is convex at a circumference. The image-side surface S2 of the first lens L1 is concave near the optical axis and is concave at a circumference.

The second lens L2 has a negative refractive power. The object-side surface S3 of the second lens L2 is concave near the optical axis and is concave at a circumference. The image-side surface S4 of the second lens L2 is convex near the optical axis and is convex at a circumference.

The third lens L3 has a negative refractive power. The object-side surface S5 of the third lens L3 is convex near the optical axis and is concave at a circumference. The image-side surface S6 of the third lens L3 is concave near the optical axis and is concave at a circumference.

The fourth lens L4 has a positive refractive power. The object-side surface S7 of the fourth lens L4 is convex near the optical axis and is convex at a circumference. The image-side surface S8 of the fourth lens L4 is concave near the optical axis and is concave at a circumference.

The fifth lens L5 has a positive refractive power. The object-side surface S9 of the fifth lens L5 is convex near the optical axis and is convex at a circumference. The image-side surface S10 of the fifth lens L5 is convex near the optical axis and is convex at a circumference.

The sixth lens L6 has a positive refractive power. The object-side surface S11 of the sixth lens L6 is convex near the optical axis and is convex at a circumference. The image-side surface S12 of the sixth lens L6 is convex near the optical axis and is convex at a circumference.

The seventh lens L7 has a negative refractive power. The object-side surface S13 of the seventh lens L7 is convex near the optical axis and is concave at a circumference. The image-side surface S14 of the seventh lens L7 is concave near the optical axis and is concave at a circumference.

The eighth lens L8 has a positive refractive power. The object-side surface S15 of the eighth lens L8 is concave near the optical axis and is convex at a circumference. The image-side surface S16 of the eighth lens L8 is convex near the optical axis and is convex at a circumference.

Figure 2A:
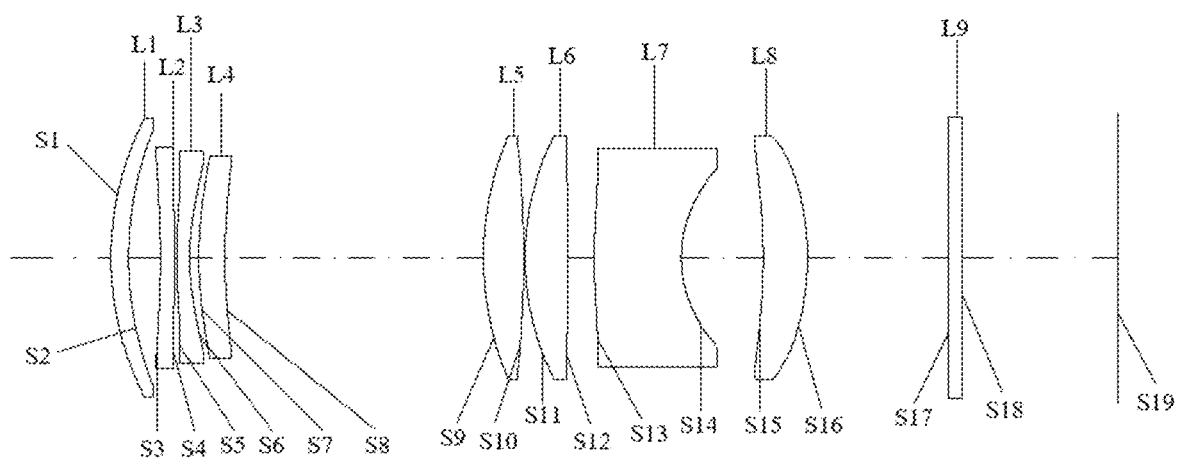
FIG. 2a is a schematic structural view of an optical system at a wide-angle end according to an implementation.
Figure 2B:
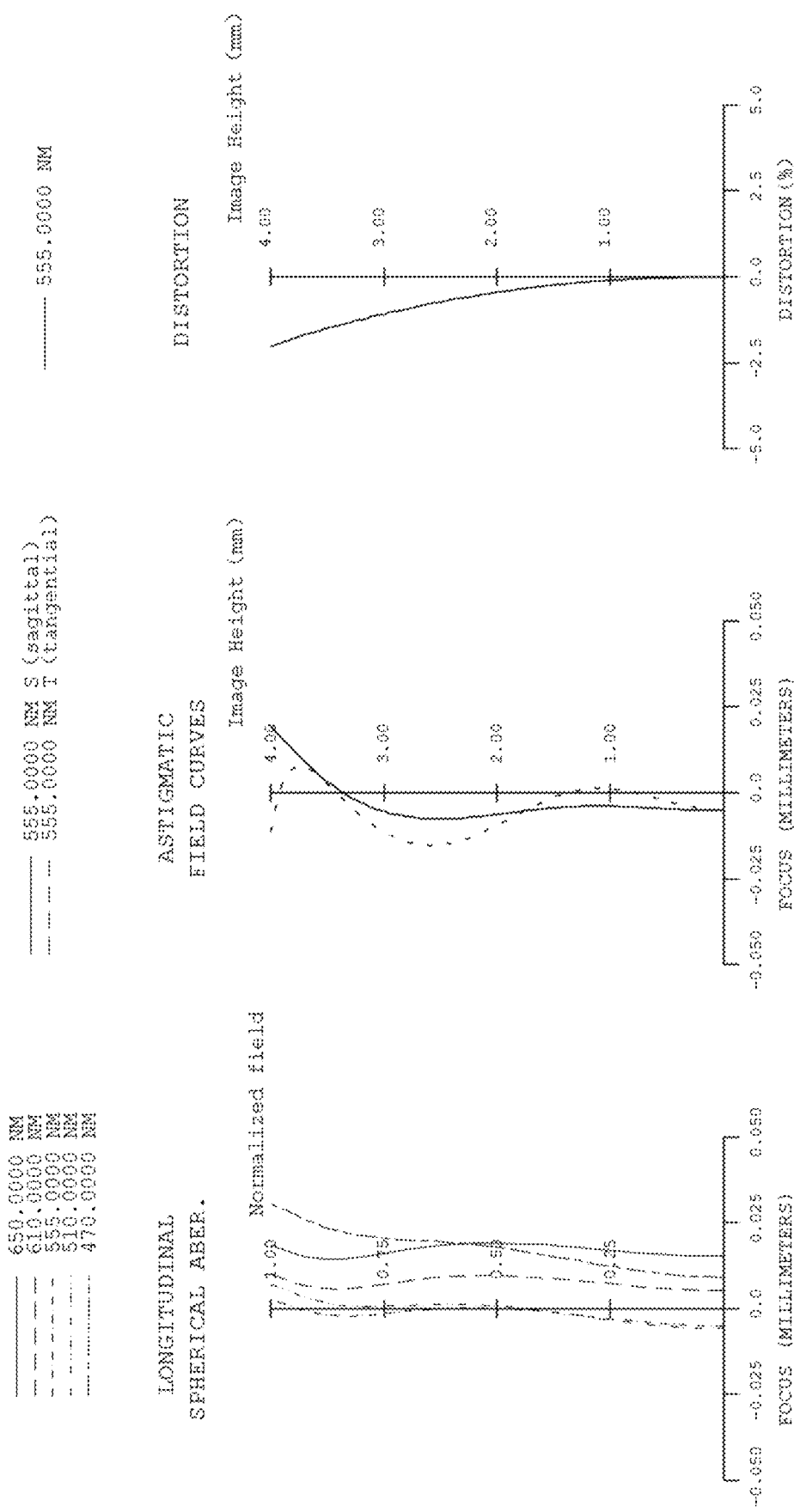
Figure 2C:
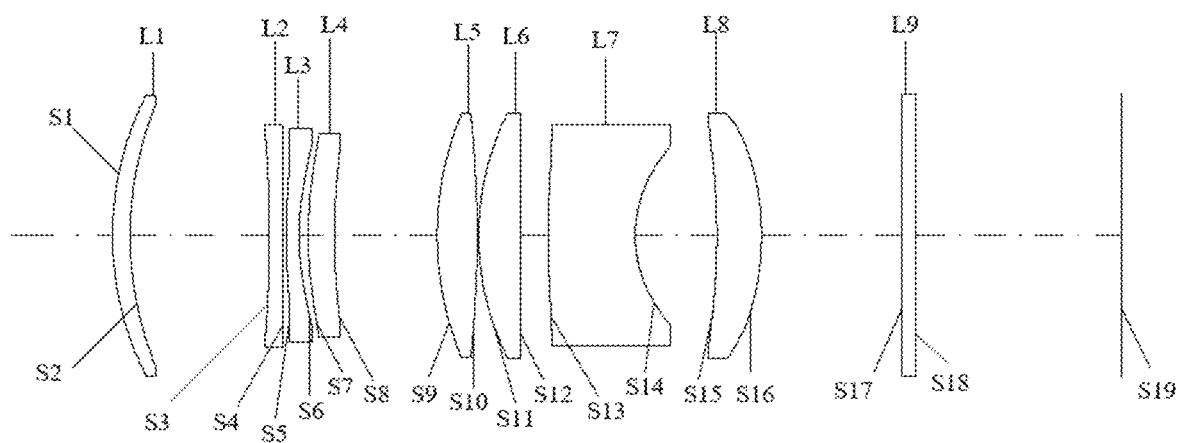
FIG. 2c is a schematic structural view of the optical system at an intermediate according to an implementation.
Figure 2D:
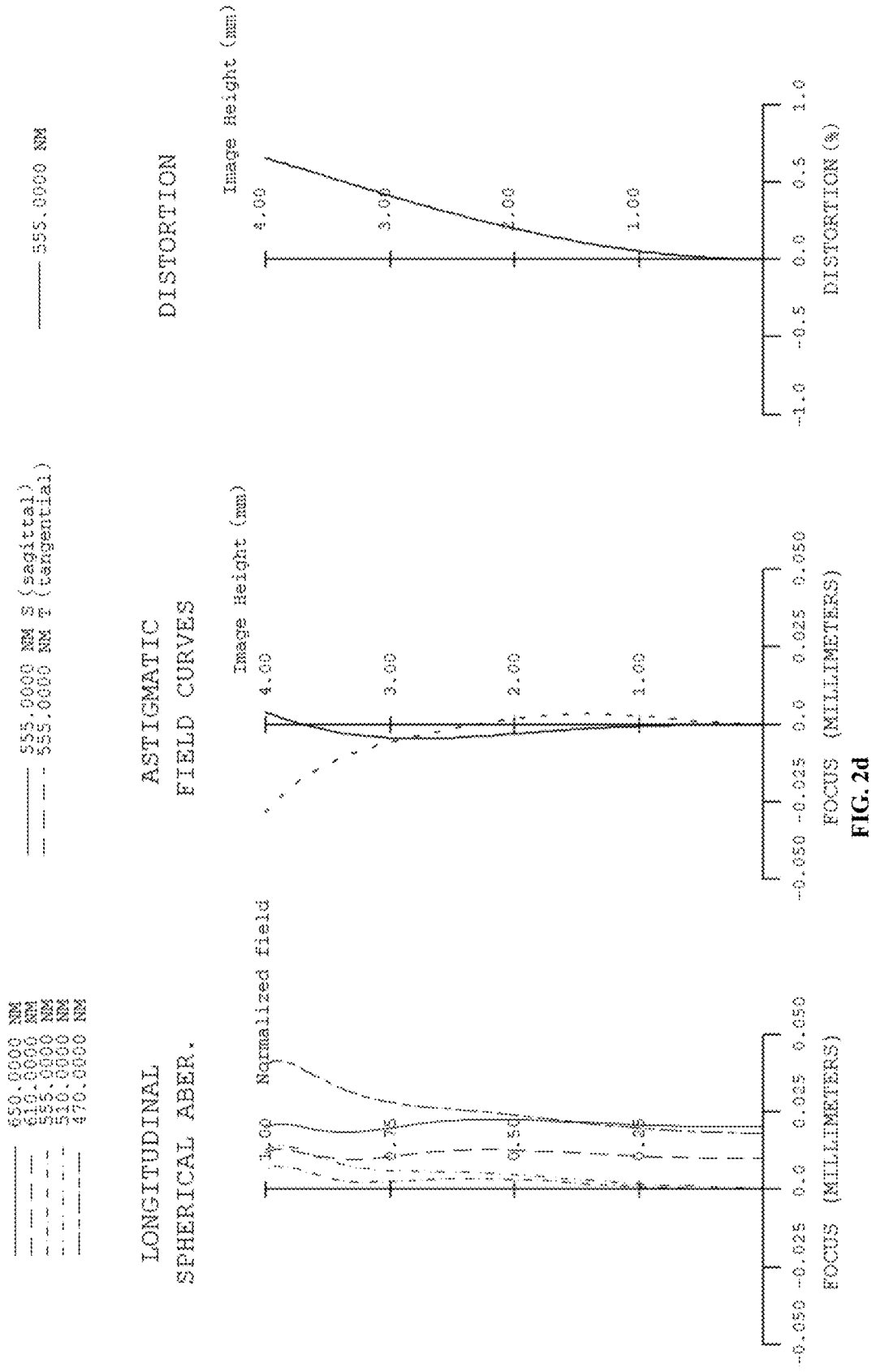
FIG. 2d illustrates a longitudinal spherical aberration curve, an astigmatic field curve, and a distortion curve of the optical system at the intermediate of FIG. 2c.
Figure 2E:
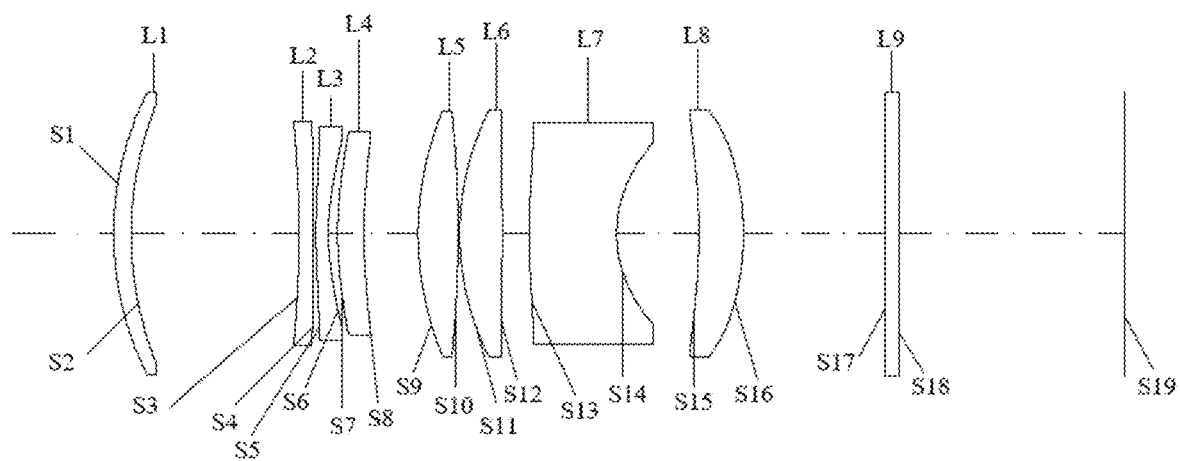
FIG. 2e is a schematic structural view of the optical system at a telephoto end according to an implementation.

The other structures of the optical system illustrated in FIGS. 2a, 2c, and 2e are identical with the optical system illustrated in FIGS. 1a, 1c, and 1e, reference can be made to the optical system illustrated in FIGS. 1a, 1c, and 1e.

Table 2a(1) and Table 2a(2) show characteristics of the optical system in this implementation. Each of Y radius, thickness, and focal length is in units of millimeter (mm). The focal length is evaluated at a reference wavelength of 555 nm, a refractive index and an Abbe number is evaluated at a reference wavelength of 587.56 nm.

TABLE 2a (1)

Optical system illustrated in FIGS. 2a. 2c, and 2e
TTL = 28.65 mm

| Surface Number | Surface Name | Shape | Y Radius | Thickness | Material | Refractive Index | Abbe Number | Focal Length |
|---|---|---|---|---|---|---|---|---|
| Object surface | Object surface | Spherical | Infinity | Infinity | | | | |
| S1 | first lens | Spherical | 8.9578 | 0.5000 | Glass | 1.487 | 70.40 | 150.233216 |
| S2 | | Spherical | 10.0194 | D1 | | | | |
| S3 | second lens | Spherical | −34.7677 | 0.3990 | Glass | 1.744 | 50.77 | |
| S4 | | Spherical | −177.0082 | 0.0800 | | | | −58.200723 |
| S5 | third lens | Aspherical | 17.7134 | 0.3584 | Plastic | 1.535 | 55.75 | −23.35882 |
| S6 | | Aspherical | 7.2757 | 0.2639 | | | | |
| S7 | | Aspherical | 11.7028 | 0.7447 | | | | |
| S8(stop) | fourth lens | Aspherical | 16.4142 | D2 | Plastic | 1.671 | 19.24 | 57.107567 |
| S9 | fifth lens | Spherical | 9.1223 | 1.1337 | Plastic | 1.535 | 55.75 | 13.544264 |
| S10 | | Spherical | −33.7070 | 0.0450 | | | | |
| S11 | sixth lens | Spherical | 7.8746 | 1.2046 | Glass | 1.573 | 57.76 | 13.263486 |

TABLE 2a (1)-continued

Optical system illustrated in FIGS. 2a. 2c, and 2e
TTL = 28.65 mm

| Surface Number | Surface Name | Shape | Y Radius | Thickness | Material | Refractive Index | Abbe Number | Focal Length |
|---|---|---|---|---|---|---|---|---|
| S12 | | Spherical | −200.7543 | 0.7692 | | | | |
| S13 | seventh lens | Aspherical | 21.0078 | 2.4744 | Plastic | 1.671 | 19.24 | −6.704204 |
| S14 | | Aspherical | 3.5313 | 2.3273 | | | | |
| S15 | eighth lens | Aspherical | −18.3083 | 1.2628 | Plastic | 1.671 | 19.24 | 20.37725 |
| S16 | | Aspherical | −8.0465 | 4.0000 | | | | |
| S17 | Infrared cut-off filter | Spherical | Infinity | 0.4000 | Glass | 1.517 | 64.17 | |
| S18 | | Spherical | Infinity | D3 | | | | |
| S19 | Imaging plane | Spherical | Infinity | 0.0000 | | | | |

TABLE 2a (2)

| Variable Distance | D1 | D2 | D3 | f (mm) | FNO | FOV (°) |
|---|---|---|---|---|---|---|
| Telephoto end position | 0.9000 | 7.3600 | 4.4420 | 14.2 | 2.87 | 16.1 |
| Intermediate position | 3.9610 | 2.9153 | 5.8256 | 18.0 | 3.45 | 12.4 |
| Wide-angle position | 4.7483 | 1.5324 | 6.4113 | 19.6 | 3.73 | 11.4 |

Each parameter in Table 2a(1) and Table 2a(2) represents the same meaning as that in the Table 1a(1) and Table 1a(2).

Table 2b shows higher-order coefficients that can be used for each aspherical lens surface of the optical system illustrated in FIGS. 2a, 2c, and 2e, where a shape of each aspherical lens surface can be defined by the formula given in the implementations of the optical system illustrated in FIGS. 1a, 1c, and 1e.

TABLE 2b

| Surface Number | K | A4 | A6 | A8 | A10 | A12 | A14 | A16 | A18 | A20 |
|---|---|---|---|---|---|---|---|---|---|---|
| S5 | 2.85E+00 | −2.95E−03 | 9.00E−05 | 0.00E+00 | 0.00E+00 | 0.00E+00 | 0.00E+00 | 0.00E+00 | 0.00E+00 | 0.00E+00 |
| S6 | 2.79E+00 | −3.92E−03 | 8.00E−05 | −1.00E−05 | 0.00E+00 | 0.00E+00 | 0.00E+00 | 0.00E+00 | 0.00E+00 | 0.00E+00 |
| S7 | 1.00E+01 | −1.82E−03 | 5.00E−05 | −1.00E−05 | 0.00E+00 | 0.00E+00 | 0.00E+00 | 0.00E+00 | 0.00E+00 | 0.00E+00 |
| S8 | 9.70E+00 | −1.50E−03 | 7.00E−05 | −1.00E−05 | 0.00E+00 | 0.00E+00 | 0.00E+00 | 0.00E+00 | 0.00E+00 | 0.00E+00 |
| S13 | 0.00E+00 | −1.34E−03 | 0.00E+00 | 0.00E+00 | 0.00E+00 | 0.00E+00 | 0.00E+00 | 0.00E+00 | 0.00E+00 | 0.00E+00 |
| S14 | 0.00E+00 | −1.45E−03 | −1.10E−04 | 1.00E−05 | 0.00E+00 | 0.00E+00 | 0.00E+00 | 0.00E+00 | 0.00E+00 | 0.00E+00 |
| S15 | −3.09E+01 | −2.50E−04 | −1.00E−05 | 0.00E+00 | 0.00E+00 | 0.00E+00 | 0.00E+00 | 0.00E+00 | 0.00E+00 | 0.00E+00 |
| S16 | 2.95E+00 | 3.70E−04 | −3.00E−05 | 0.00E+00 | 0.00E+00 | 0.00E+00 | 0.00E+00 | 0.00E+00 | 0.00E+00 | 0.00E+00 |

FIG. 2a is a schematic structural view of an optical system at a wide-angle end according to an implementation. FIG. 2b illustrates a longitudinal spherical aberration curve, an astigmatic field curve, and a distortion curve of the optical system at the wide-angle end of FIG. 2a. As illustrated in FIG. 2b, the optical system of illustrated in FIGS. 2a, 2c, and 2e can achieve good imaging quality.

FIG. 2c is a schematic structural view of the optical system at an intermediate according to an implementation. FIG. 2d illustrates a longitudinal spherical aberration curve, an astigmatic field curve, and a distortion curve of the optical system at the intermediate of the FIG. 2c. As illustrated in FIG. 2d, the optical system illustrated in FIGS. 2a, 2c, and 2e can achieve good imaging quality.

Figure 2F:
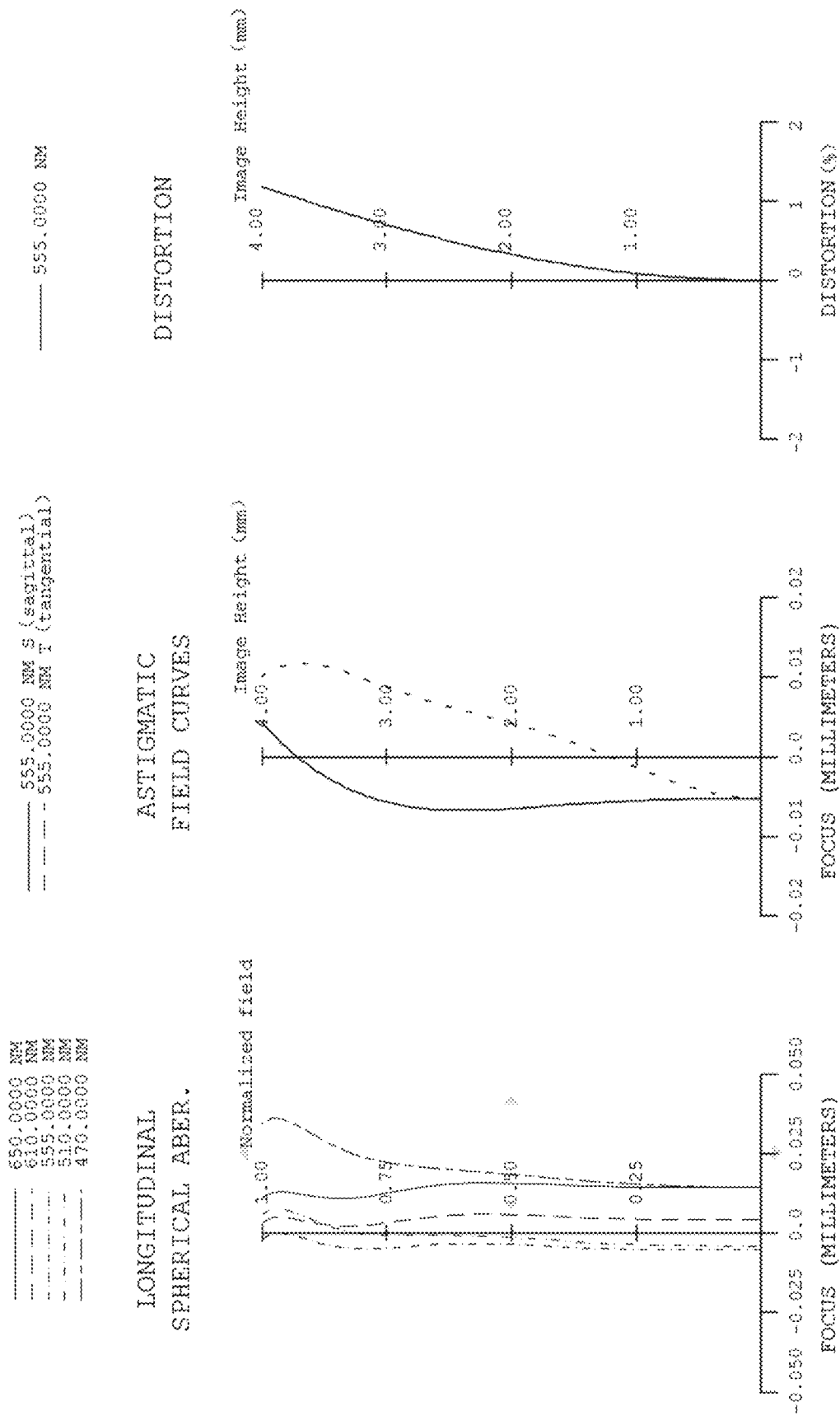
FIG. 2f illustrates a longitudinal spherical aberration curve, an astigmatic field curve, and a distortion curve of the optical system at the telephoto end of FIG. 2e.

FIG. 2e is a schematic structural view of the optical system at a telephoto end according to an implementation. FIG. 2f illustrates a longitudinal spherical aberration curve, an astigmatic field curve, and a distortion curve of the optical system at the telephoto end of FIG. 2e n. As illustrated in FIG. 2f, the optical system o illustrated in FIGS. 2a, 2c, and 2e can achieve good imaging quality.

Referring to FIGS. 3a to 3f, the optical system in this implementation includes a first lens L1, a second lens L2, a third lens L3, a fourth lens L4, a fifth lens L5, a sixth lens L6, a seventh lens L7, and an eighth lens L8 which are sequentially arranged from the object side to the image side along the optical axis of the optical system.

The first lens L1 has a positive refractive power. The object-side surface S1 of the first lens L1 is convex near the optical axis and is convex at a circumference. The image-side surface S2 of the first lens L1 is concave near the optical axis and is concave at a circumference.

The second lens L2 has a negative refractive power. The object-side surface S3 of the second lens L2 is convex near the optical axis and is convex at a circumference. The image-side surface S4 of the second lens L2 is concave near the optical axis and is concave at a circumference.

The third lens L3 has a negative refractive power. The object-side surface S5 of the third lens L3 is convex near the optical axis and is concave at a circumference. The image-side surface S6 of the third lens L3 is concave near the optical axis and is convex at a circumference.

The fourth lens L4 has a positive refractive power. The object-side surface S7 of the fourth lens L4 is convex near the optical axis and is concave at a circumference. The image-side surface S8 of the fourth lens L4 is convex near the optical axis and is convex at a circumference.

The fifth lens L5 has a positive refractive power. The object-side surface S9 of the fifth lens L5 is convex near the optical axis and is convex at a circumference. The image-side surface S10 of the fifth lens L5 is convex near the optical axis and is convex at a circumference.

The sixth lens L6 has a positive refractive power. The object-side surface S11 of the sixth lens L6 is convex near the optical axis and is convex at a circumference. The image-side surface S12 of the sixth lens L6 is convex near the optical axis and is convex at a circumference.

The seventh lens L7 has a negative refractive power. The object-side surface S13 of the seventh lens L7 is convex near the optical axis and is concave at a circumference. The image-side surface S14 of the seventh lens L7 is concave near the optical axis and is concave at a circumference.

The eighth lens L8 has a positive refractive power. The object-side surface S15 of the eighth lens L8 is concave near the optical axis and is concave at a circumference. The image-side surface S16 of the eighth lens L8 is convex near the optical axis and is convex at a circumference.

Figure 3A:
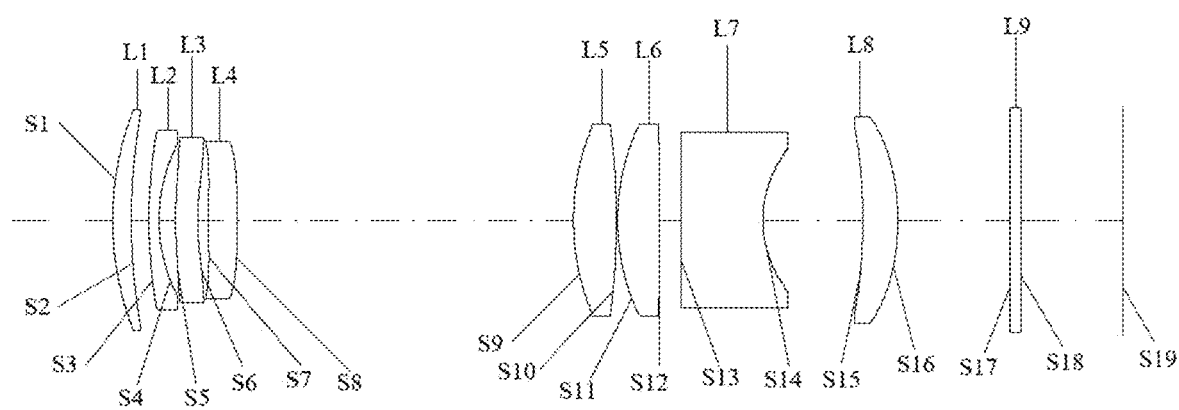
FIG. 3a is a schematic structural view of an optical system at a wide-angle end according to an implementation.
Figure 3B:
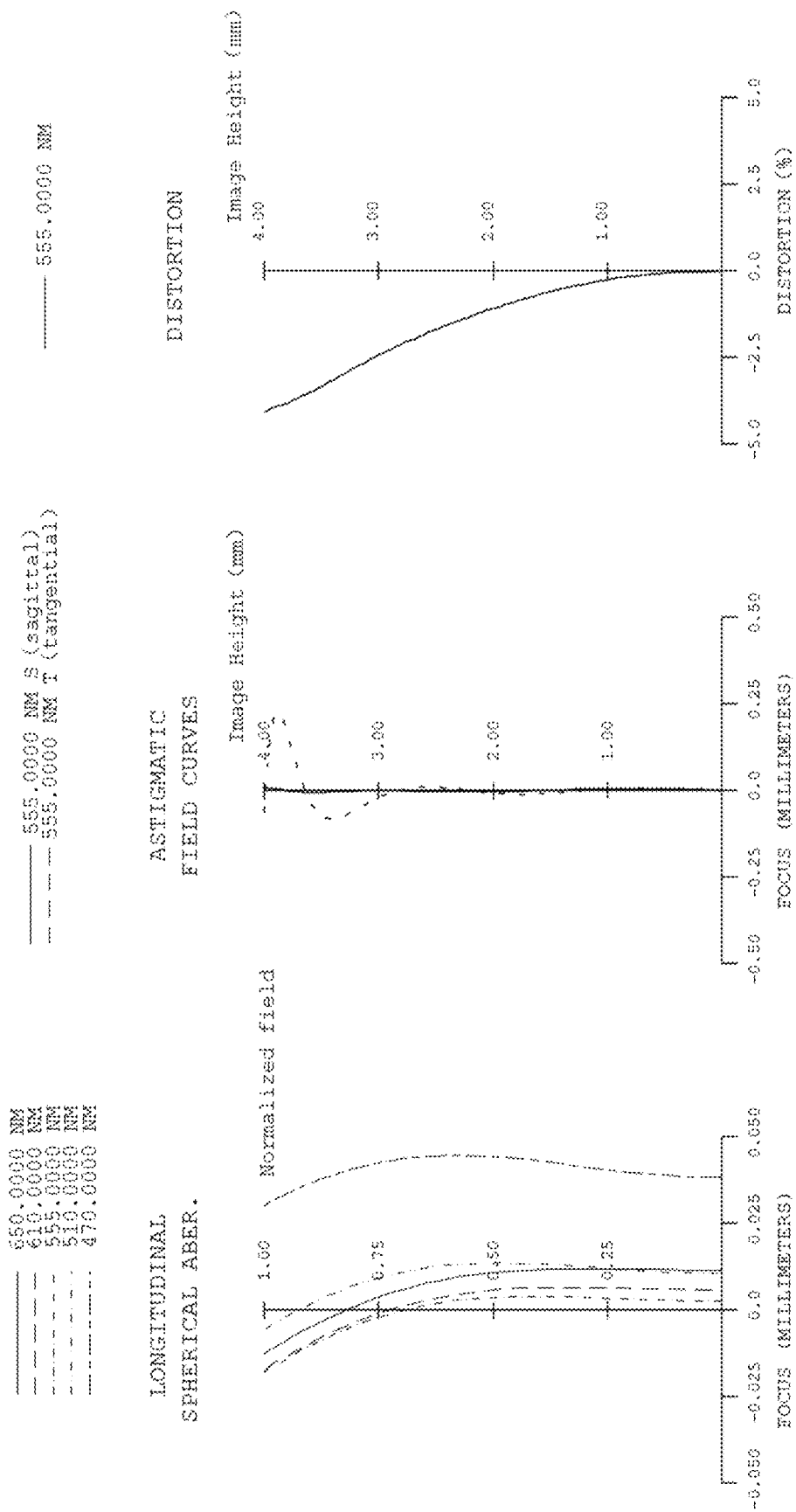
Figure 3C:
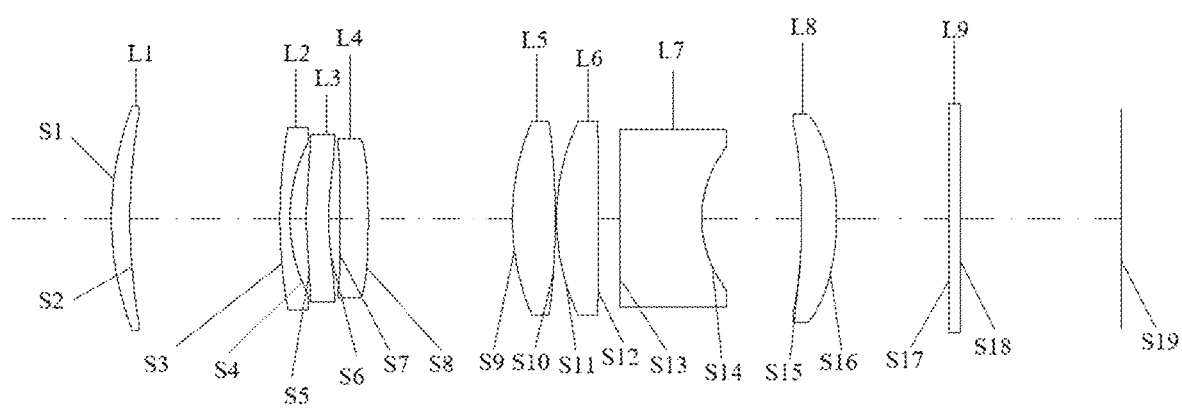
FIG. 3c is a schematic structural view of the optical system at an intermediate according to an implementation.
Figure 3D:
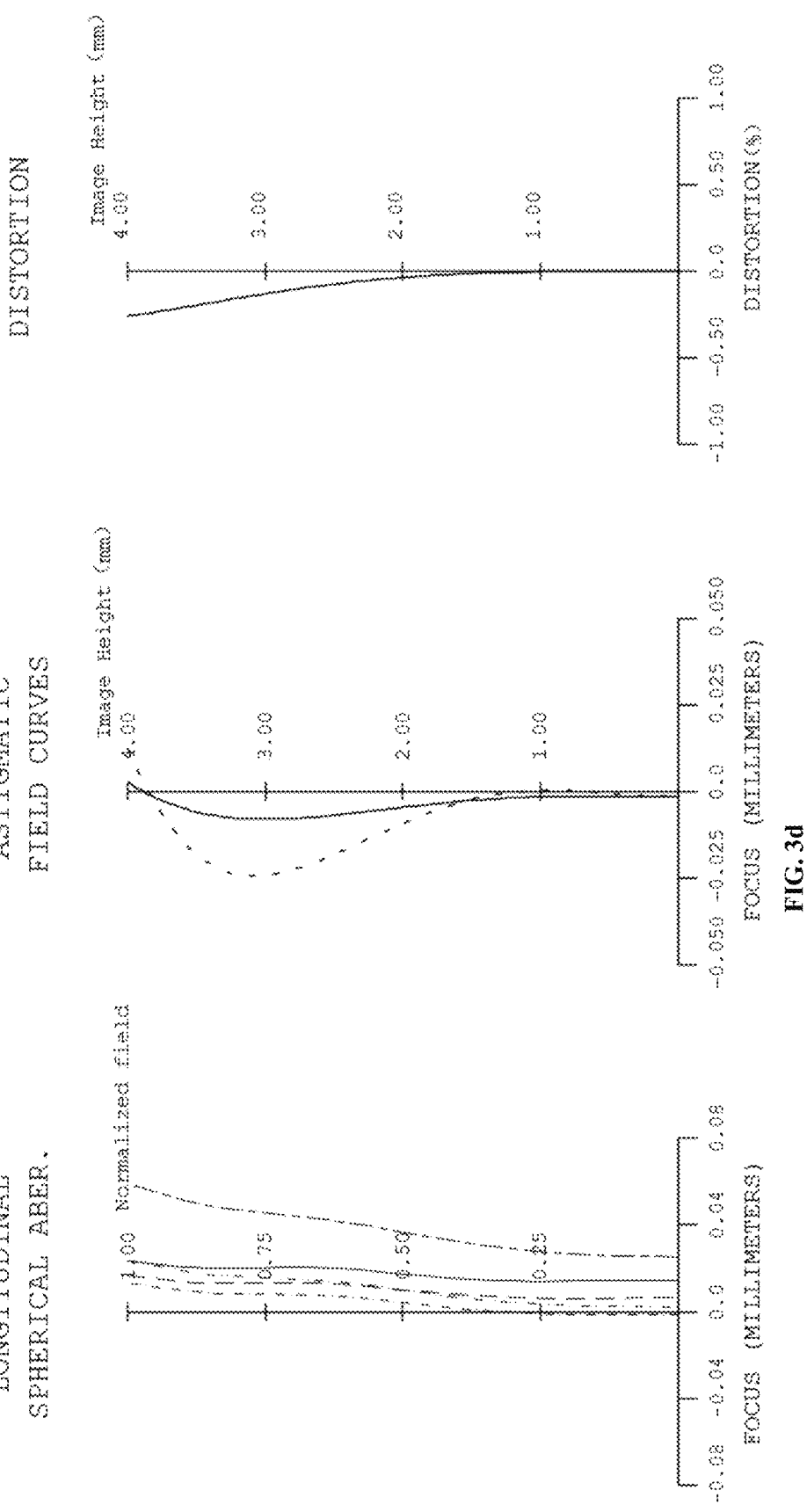
FIG. 3d a longitudinal spherical aberration curve, an astigmatic field curve, and a distortion curve of the optical system at the intermediate of FIG. 3c.
Figure 3E:
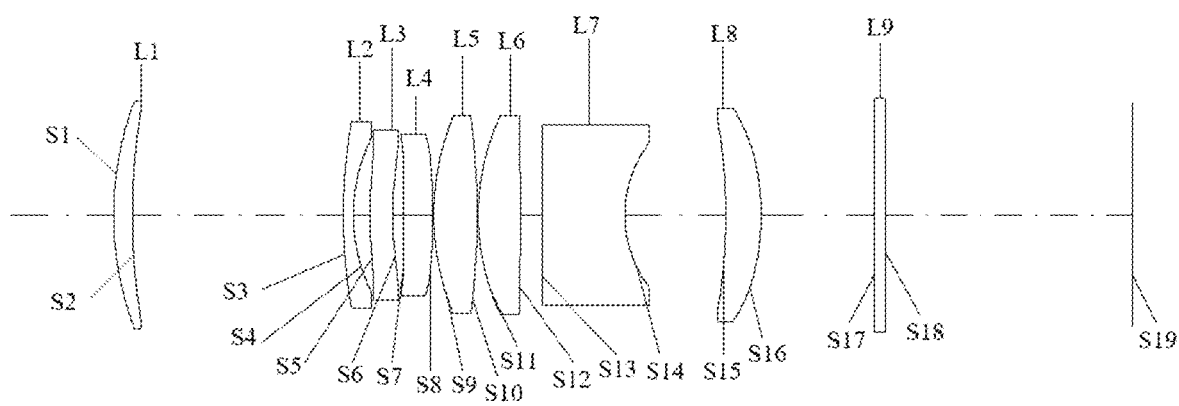
FIG. 3e is a schematic structural view of the optical system at a telephoto end according to an implementation.

The other structures of the optical system illustrated in FIGS. 3a, 3c, and 3e are identical with the optical system illustrated in FIGS. 1a, 1c, and 1e, reference can be made to the optical system illustrated in FIGS. 1a, 1c, and 1e.

Table 3a(1) and Table 3a(2) show characteristics of the optical system in this implementation. Each of Y radius, thickness, and focal length is in units of millimeter (mm). The focal length is evaluated at a reference wavelength of 555 nm, a refractive index and an Abbe number is evaluated at a reference wavelength of 587.56 nm.

TABLE 3a (1)

The optical system illustrated in FIGS. 3a, 3c, and 3e
TTL = 36 mm

| Surface Number | Surface Name | Shape | Y Radius | Thickness | Material | Refractive Index | Abbe Number | Focal Length |
|---|---|---|---|---|---|---|---|---|
| Object surface | Object surface | Spherical | Infinity | Infinity | | | | |
| S1 | first lens | Spherical | 11.4642 | 0.6612 | Glass | 1.487 | 70.40 | 46.435773 |
| S2 | | Spherical | 22.7886 | D1 | | | | |
| S3 | second lens | Spherical | 19.5312 | 0.3540 | Glass | 1.744 | 50.77 | −12.370469 |
| S4 | | Spherical | 6.2090 | 0.5901 | | | | |
| S5 | third lens | Aspherical | 14.0939 | 0.7949 | Plastic | 1.535 | 55.75 | −69.257096 |
| S6 | | Aspherical | 10.0095 | 0.3880 | | | | |
| S7 | fourth lens | Aspherical | 64.8937 | 1.0190 | Plastic | 1.671 | 19.24 | 39.808519 |
| S8 (stop) | | Aspherical | −45.1498 | D2 | | | | |
| S9 | fifth lens | Spherical | 9.3221 | 1.5276 | Plastic | 1.535 | 55.75 | 13.265675 |
| S10 | | Spherical | −28.0372 | 0.0450 | | | | |
| S11 | sixth lens | Spherical | 8.3984 | 1.4828 | Glass | 1.573 | 57.76 | 14.32895 |
| S12 | | Spherical | −330.5173 | 0.7636 | | | | |
| S13 | seventh lens | Aspherical | 55.3328 | 2.9271 | Plastic | 1.671 | 19.24 | −6.858702 |
| S14 | | Aspherical | 4.1604 | 3.5645 | | | | |
| S15 | eighth lens | Aspherical | −23.0100 | 1.2495 | Plastic | 1.671 | 19.24 | 21.945354 |
| S16 | | Aspherical | −9.1777 | 4.0000 | | | | |
| S17 | Infrared cut-off filter | Spherical | Infinity | 0.4000 | Glass | 1.517 | 64.17 | |
| S18 | | Spherical | Infinity | D3 | | | | |
| S19 | Imaging plane | Spherical | Infinity | 0.0000 | | | | |

TABLE 3a (2)

| Variable Distance | D1 | D2 | D3 | f (mm) | FNO | FOV (°) |
|---|---|---|---|---|---|---|
| Telephoto end position | 0.6348 | 11.9841 | 3.6089 | 11.8 | 3.09 | 19.5 |
| Intermediate position | 5.3441 | 5.1407 | 5.7530 | 18.5 | 3.45 | 12.2 |
| Wide-angle position | 7.4518 | 0.0500 | 8.7260 | 27 | 4.65 | 8.3 |

Each parameter in Table 3a(1) and Table 3a(2) represents the same meaning as that in Table 1a(1) and Table 1a(2).

Table 3b shows higher-order coefficients that can be used for each aspherical lens surface of the optical system illustrated in FIGS. 3a, 3c, and 3e, where a shape of each aspherical lens surface can be defined by the formula given in implementations of the optical system illustrated in FIGS. 1a, 1c, and 1e.

TABLE 3b

| Surface Number | K | A4 | A6 | A8 | A10 | A12 | A14 | A16 | A18 | A20 |
|---|---|---|---|---|---|---|---|---|---|---|
| S5 | 4.81E+00 | −2.98E−03 | 1.00E−05 | 0.00E+00 | 0.00E+00 | 0.00E+00 | 0.00E+00 | 0.00E+00 | 0.00E+00 | 0.00E+00 |
| S6 | 2.93E+00 | −3.76E−03 | 8.00E−05 | −1.00E−05 | 0.00E+00 | 0.00E+00 | 0.00E+00 | 0.00E+00 | 0.00E+00 | 0.00E+00 |
| S7 | −4.43E+01 | −2.04E−03 | 4.00E−05 | −1.00E−05 | 0.00E+00 | 0.00E+00 | 0.00E+00 | 0.00E+00 | 0.00E+00 | 0.00E+00 |
| S8 | 9.90E+01 | −1.73E−03 | 1.00E−05 | −1.00E−05 | 0.00E+00 | 0.00E+00 | 0.00E+00 | 0.00E+00 | 0.00E+00 | 0.00E+00 |
| S13 | 0.00E+00 | −8.70E−04 | 1.00E−05 | 0.00E+00 | 0.00E+00 | 0.00E+00 | 0.00E+00 | 0.00E+00 | 0.00E+00 | 0.00E+00 |

TABLE 3b-continued

| Surface Number | K | A4 | A6 | A8 | A10 | A12 | A14 | A16 | A18 | A20 |
|---|---|---|---|---|---|---|---|---|---|---|
| S14 | 0.00E+00 | −5.80E−04 | −2.00E−05 | 0.00E+00 | 0.00E+00 | 0.00E+00 | 0.00E+00 | 0.00E+00 | 0.00E+00 | 0.00E+00 |
| S15 | −1.83E+01 | −3.30E−04 | −2.00E−05 | 0.00E+00 | 0.00E+00 | 0.00E+00 | 0.00E+00 | 0.00E+00 | 0.00E+00 | 0.00E+00 |
| S16 | 3.46E+00 | 1.70E−04 | −1.00E−05 | 0.00E+00 | 0.00E+00 | 0.00E+00 | 0.00E+00 | 0.00E+00 | 0.00E+00 | 0.00E+00 |

FIG. 3a is a schematic structural view of an optical system at a wide-angle end according to an implementation. FIG. 3b illustrates a longitudinal spherical aberration curve, an astigmatic field curve, and a distortion curve of the optical system at the wide-angle end of FIG. 3a. As illustrated in FIG. 3b, the optical system illustrated in FIGS. 3a, 3c, and 3e can achieve good imaging quality.

FIG. 3c is a schematic structural view of the optical system at an intermediate according to an implementation. FIG. 3d a longitudinal spherical aberration curve, an astigmatic field curve, and a distortion curve of the optical system at the intermediate of the FIG. 3c. As illustrated in FIG. 3d, the optical system illustrated in FIGS. 3a, 3c, and 3e can achieve good imaging quality.

Figure 3F:
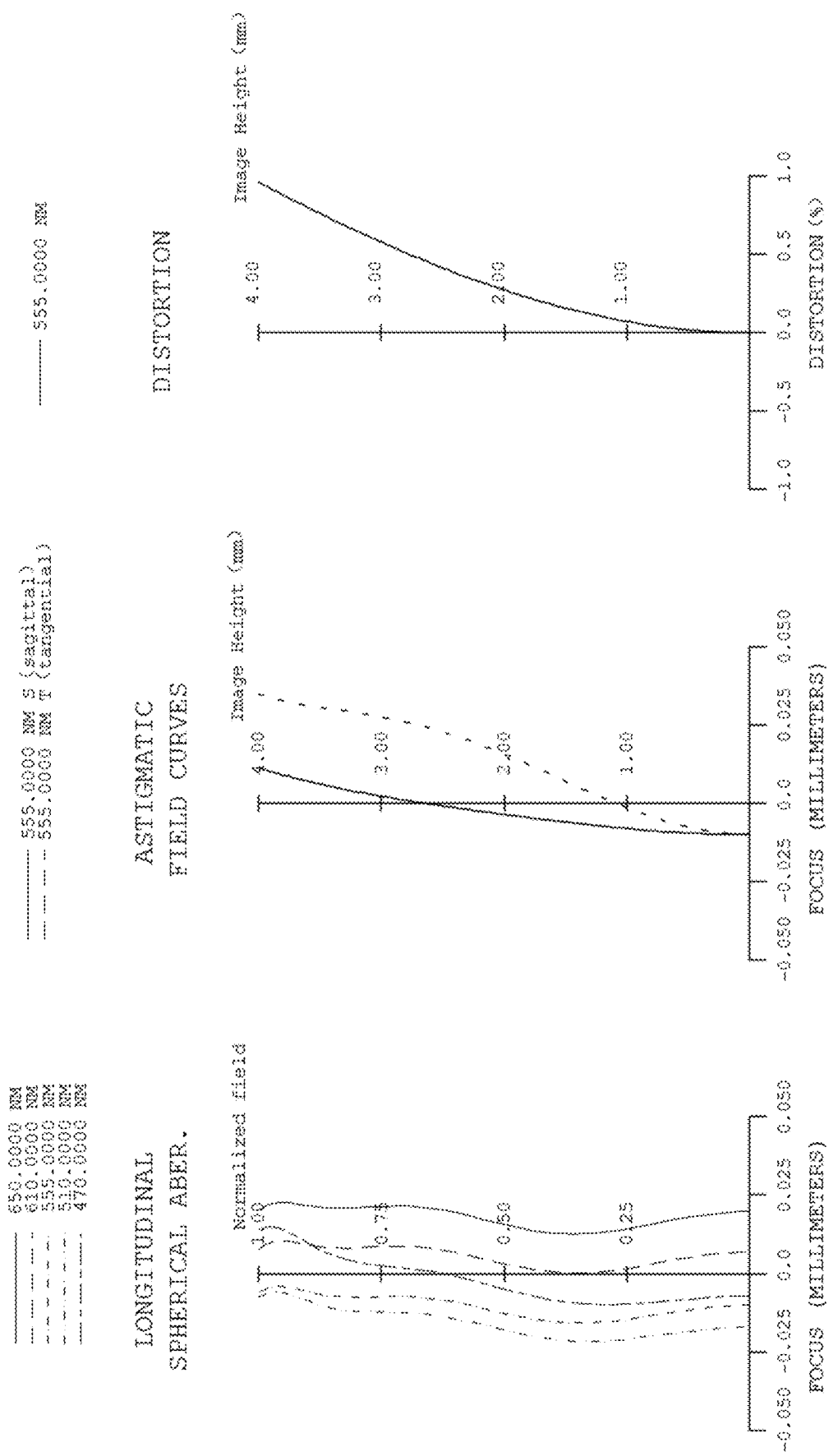
FIG. 3f illustrates a longitudinal spherical aberration curve, an astigmatic field curve, and a distortion curve of the optical system at the telephoto end of FIG. 3e.

FIG. 3e is a schematic structural view of the optical system at a telephoto end according to an implementation. FIG. 3f illustrates a longitudinal spherical aberration curve, an astigmatic field curve, and a distortion curve of the optical system at the telephoto end of FIG. 3e. As illustrated in FIG. 3f, the optical system illustrated in FIGS. 3a, 3c, and 3e can achieve good imaging quality.

Referring to FIGS. 4a to 4f, the optical system in this implementation includes a first lens L1, a second lens L2, a third lens L3, a fourth lens L4, a fifth lens L5, a sixth lens L6, a seventh lens L7, and an eighth lens L8 which are sequentially arranged from the object side to the image side along the optical axis of the optical system.

The first lens L1 has a positive refractive power. The object-side surface S1 of the first lens L1 is convex near the optical axis and is convex at a circumference. The image-side surface S2 of the first lens L1 is concave near the optical axis and is concave at a circumference.

The second lens L2 has a negative refractive power. The object-side surface S3 of the second lens L2 is convex near the optical axis and is convex at a circumference. The image-side surface S4 of the second lens L2 is concave near the optical axis and is concave at a circumference.

The third lens L3 has a negative refractive power. The object-side surface S5 of the third lens L3 is convex near the optical axis and is concave at a circumference. The image-side surface S6 of the third lens L3 is concave near the optical axis and is convex at a circumference.

The fourth lens L4 has a positive refractive power. The object-side surface S7 of the fourth lens L4 is convex near the optical axis and is concave at a circumference. The image-side surface S8 of the fourth lens L4 is convex near the optical axis and is convex at a circumference.

The fifth lens L5 has a positive refractive power. The object-side surface S9 of the fifth lens L5 is convex near the optical axis and is convex at a circumference. The image-side surface S10 of the fifth lens L5 is convex near the optical axis and is convex at a circumference.

The sixth lens L6 has a positive refractive power. The object-side surface S11 of the sixth lens L6 is convex near the optical axis and is convex at a circumference. The image-side surface S12 of the sixth lens L6 is convex near the optical axis and is convex at a circumference.

The seventh lens L7 has a negative refractive power. The object-side surface S13 of the seventh lens L7 is concave near the optical axis and is concave at a circumference. The image-side surface S14 of the seventh lens L7 is concave near the optical axis and is concave at a circumference.

The eighth lens L8 has a positive refractive power. The object-side surface S15 of the eighth lens L8 is concave near the optical axis and is concave at a circumference. The image-side surface S16 of the eighth lens L8 is convex near the optical axis and is convex at a circumference.

Figure 4A:
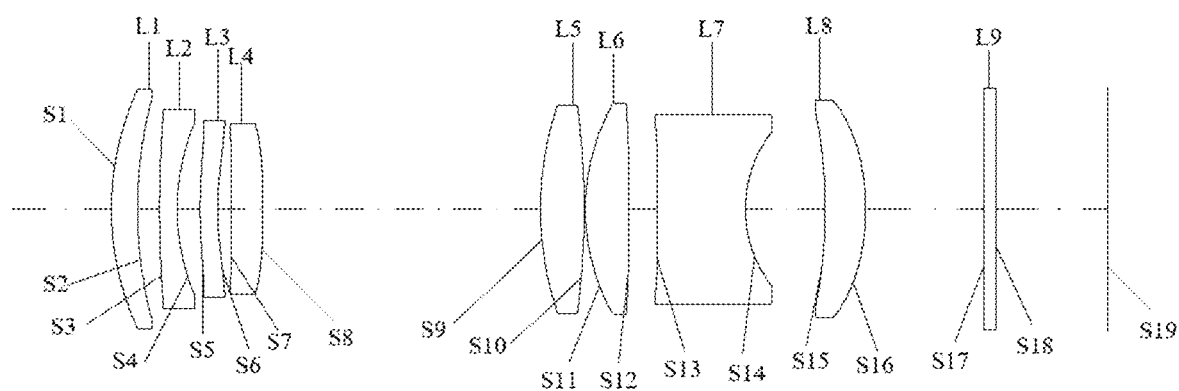
FIG. 4a is a schematic structural view of an optical system at a wide-angle end according to an implementation.
Figure 4B:
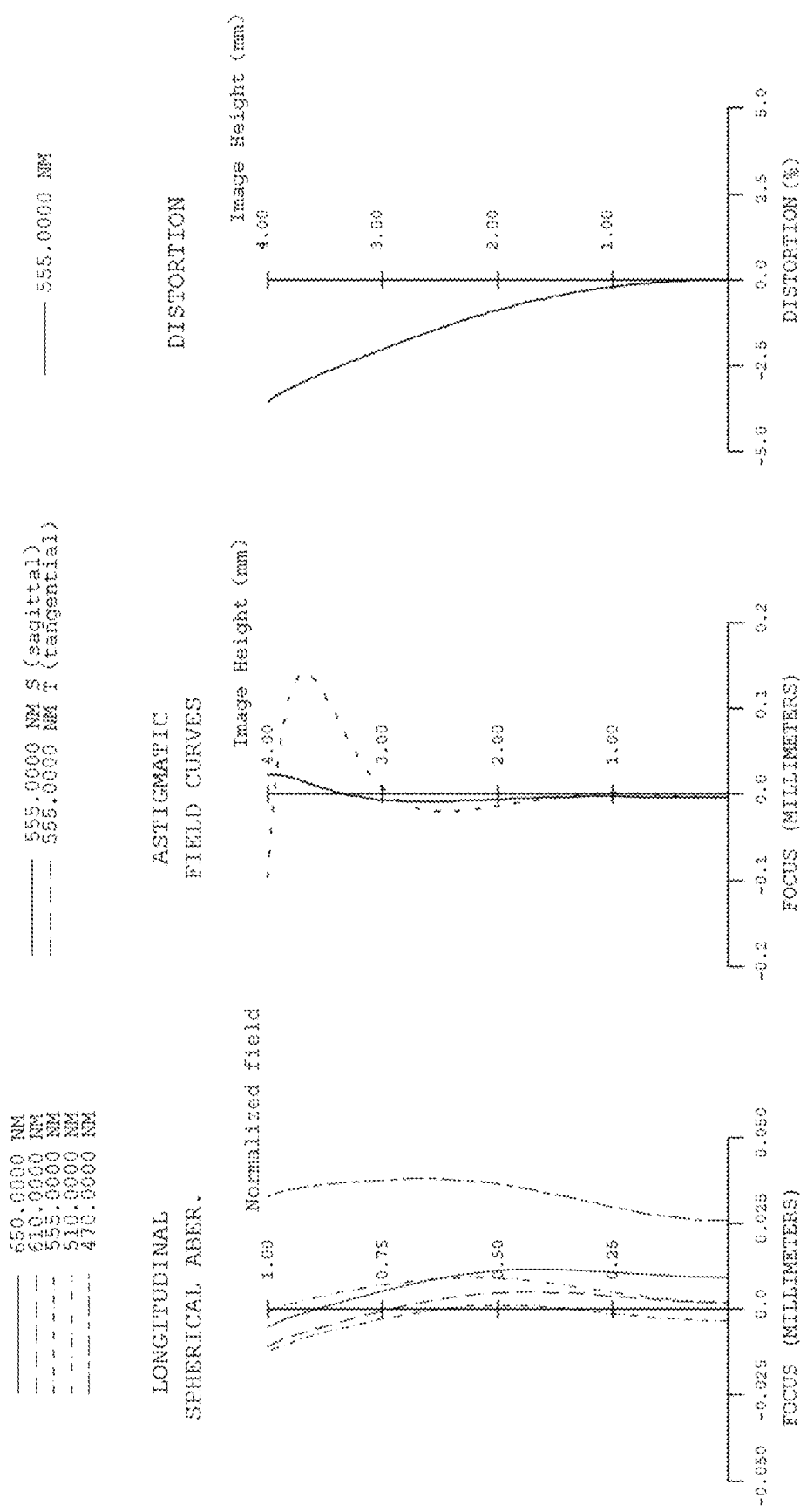
Figure 4C:
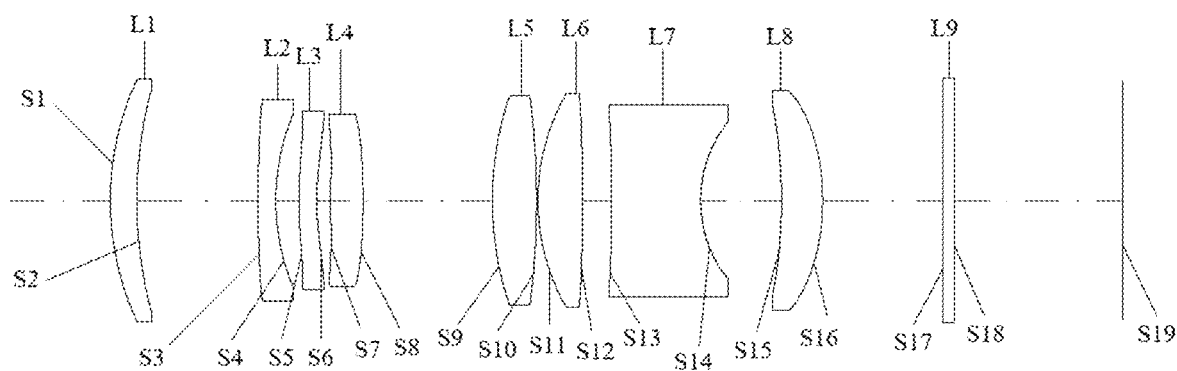
FIG. 4c is a schematic structural view of the optical system at an intermediate according to an implementation.
Figure 4D:
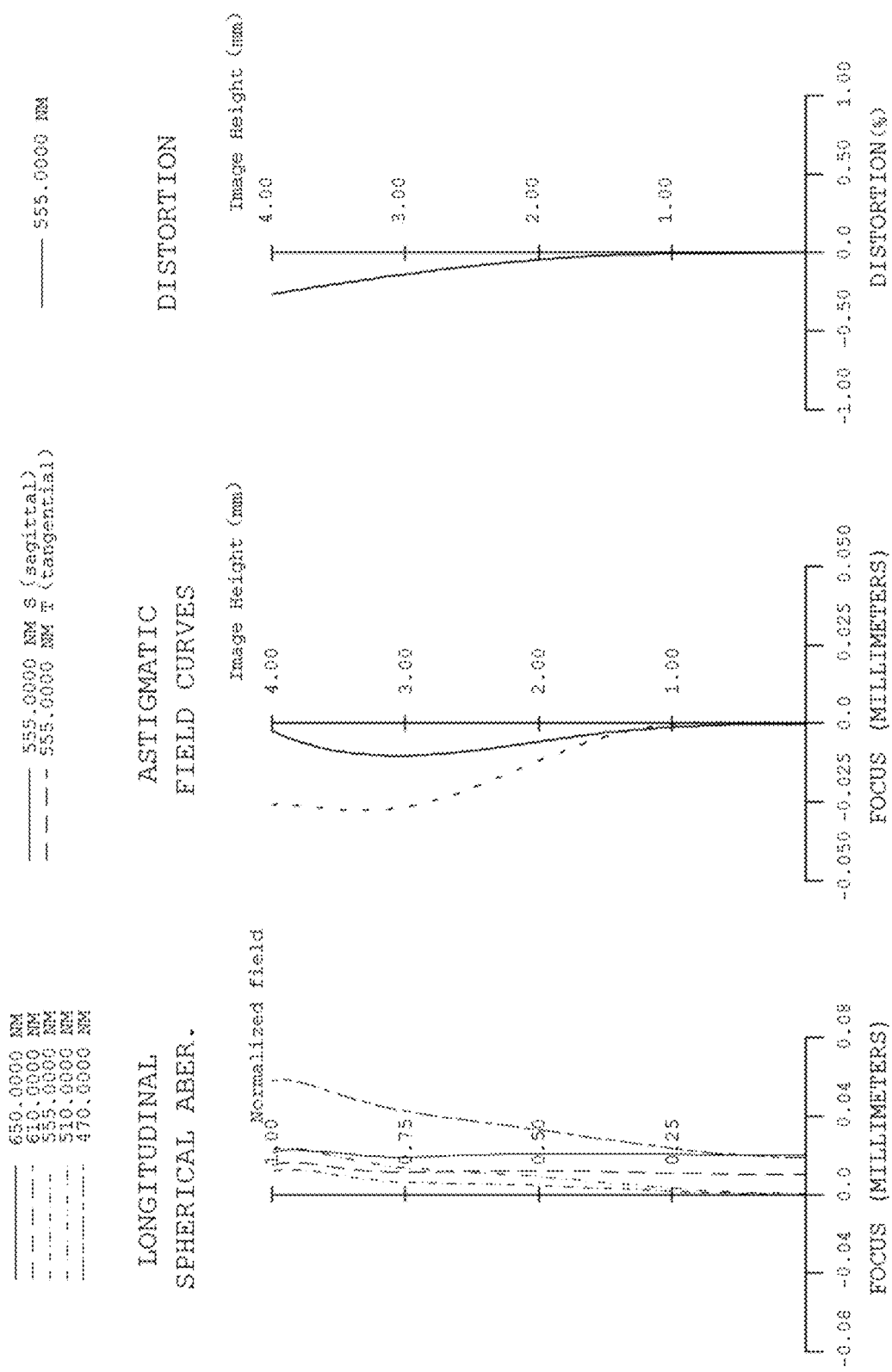
FIG. 4d a longitudinal spherical aberration curve, an astigmatic field curve, and a distortion curve of the optical system at the intermediate of FIG. 4c.
Figure 4E:
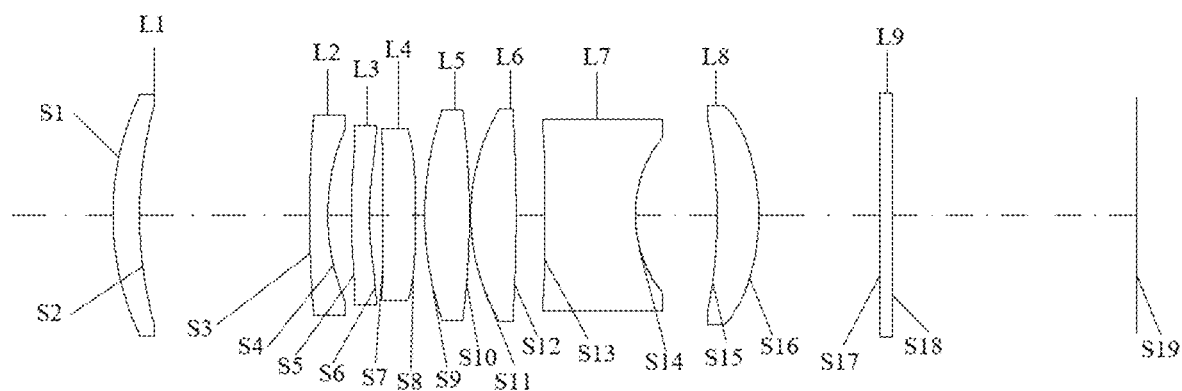
FIG. 4e is a schematic structural view of the optical system at a telephoto end according to tan implementation.

The other structures of the optical system illustrated in FIGS. 4a, 4c, and 4e are identical with the optical system illustrated in FIGS. 1a, 1c, and 1e, reference can be made to the optical system illustrated in FIGS. 1a, 1c, and 1e.

Table 4a(1) and Table 4a(2) show characteristics of the optical system in this implementation. Each of Y radius, thickness, and focal length is in units of millimeter (mm). The focal length is evaluated at a reference wavelength of 555 nm, a refractive index and an Abbe number is evaluated at a reference wavelength of 587.56 nm.

TABLE 4a (1)

Optical system illustrated in FIGS. 4a, 4c, and 4e
TTL = 33.74 mm

| Surface Number | Surface Name | Shape | Y Radius | Thickness | Material | Refractive Index | Abbe Number | Focal Length |
|---|---|---|---|---|---|---|---|---|
| Object surface | Object surface | Spherical | Infinity | Infinity | | | | |
| S1 | first lens | Spherical | 9.7100 | 0.8800 | Glass | 1.487 | 70.40 | 57.293871 |
| S2 | | Spherical | 14.4427 | D1 | | | | |
| S3 | second lens | Spherical | 40.6051 | 0.6000 | Glass | 1.744 | 50.77 | −12.68329 |
| S4 | | Spherical | 7.6110 | 0.7718 | | | | |
| S5 | third lens | Aspherical | 14.6574 | 0.5983 | Plastic | 1.535 | 55.75 | −59.0972 |
| S6 | | Aspherical | 9.8722 | 0.4606 | | | | |
| S7 | fourth lens | Aspherical | 70.9629 | 1.0667 | Plastic | 1.671 | 19.24 | 35.777602 |
| S8(stop) | | Aspherical | −36.0882 | D2 | | | | |
| S9 | fifth lens | Spherical | 11.0874 | 1.4716 | Plastic | 1.535 | 55.75 | 15.043379 |
| S10 | | Spherical | −28.0028 | 0.0450 | | | | |
| S11 | sixth lens | Spherical | 7.2889 | 1.4941 | Glass | 1.573 | 57.76 | 11.425006 |
| S12 | | Spherical | −58.9736 | 0.9578 | | | | |

TABLE 4a (1)-continued

Optical system illustrated in FIGS. 4a, 4c, and 4e
TTL = 33.74 mm

| Surface Number | Surface Name | Shape | Y Radius | Thickness | Material | Refractive Index | Abbe Number | Focal Length |
|---|---|---|---|---|---|---|---|---|
| S13 | seventh lens | Aspherical | −108.4185 | 2.9715 | Plastic | 1.671 | 19.24 | −6.257185 |
| S14 | | Aspherical | 4.4181 | 2.6926 | | | | |
| S15 | eighth lens | Aspherical | −18.5081 | 1.3737 | Plastic | 1.671 | 19.24 | 20.218011 |
| S16 | | Aspherical | −8.0639 | 4.0000 | | | | |
| S17 | Infrared cut-off filter | Spherical | Infinity | 0.4000 | Glass | 1.517 | 64.17 | |
| S18 | | Spherical | Infinity | D3 | | | | |
| S19 | Imaging plane | Spherical | Infinity | 0.0000 | | | | |

TABLE 4a (2)

| Variable Distance | D1 | D2 | D3 | f (mm) | FNO | FOV (°) |
|---|---|---|---|---|---|---|
| Telephoto end position | 0.7500 | 9.4015 | 3.7999 | 12.2 | 2.98 | 18.8 |
| Intermediate position | 4.0350 | 4.3163 | 5.5999 | 17.0 | 3.29 | 13.3 |
| Wide-angle position | 5.6000 | 0.3005 | 8.0509 | 23 | 4.29 | 9.8 |

Each parameter in Table 4a(1) and Table 4a(2) represents the same meaning as that in Table 1a(1) and Table 1a(2).

Table 4b shows higher-order coefficients that can be used for each aspherical lens surface of the optical system illustrated in FIGS. 4a, 4c, and 4e, where a shape of each aspherical lens surface can be defined by the formula given in implementations of the optical system illustrated in FIGS. 1a, 1c, and 1e.

TABLE 4b

| Surface Number | K | A4 | A6 | A8 | A10 | A12 | A14 | A16 | A18 | A20 |
|---|---|---|---|---|---|---|---|---|---|---|
| S5 | 4.68E+00 | −3.00E−03 | 2.00E−05 | 0.00E+00 | 0.00E+00 | 0.00E+00 | 0.00E+00 | 0.00E+00 | 0.00E+00 | 0.00E+00 |
| S6 | 2.92E+00 | −3.79E−03 | 9.00E−05 | −1.00E−05 | 0.00E+00 | 0.00E+00 | 0.00E+00 | 0.00E+00 | 0.00E+00 | 0.00E+00 |
| S7 | −3.62E+01 | −2.01E−03 | 6.00E−05 | −1.00E−05 | 0.00E+00 | 0.00E+00 | 0.00E+00 | 0.00E+00 | 0.00E+00 | 0.00E+00 |
| S8 | 5.26E+01 | −1.57E−03 | 2.00E−05 | −1.00E−05 | 0.00E+00 | 0.00E+00 | 0.00E+00 | 0.00E+00 | 0.00E+00 | 0.00E+00 |
| S13 | 0.00E+00 | −6.10E−04 | 1.00E−05 | 0.00E+00 | 0.00E+00 | 0.00E+00 | 0.00E+00 | 0.00E+00 | 0.00E+00 | 0.00E+00 |
| S14 | 0.00E+00 | 4.40E−04 | 3.00E−05 | 0.00E+00 | 0.00E+00 | 0.00E+00 | 0.00E+00 | 0.00E+00 | 0.00E+00 | 0.00E+00 |
| S15 | −1.53E+01 | −4.40E−04 | −3.00E−05 | 0.00E+00 | 0.00E+00 | 0.00E+00 | 0.00E+00 | 0.00E+00 | 0.00E+00 | 0.00E+00 |
| S16 | 2.81E+00 | 2.00E−04 | −2.00E−05 | 0.00E+00 | 0.00E+00 | 0.00E+00 | 0.00E+00 | 0.00E+00 | 0.00E+00 | 0.00E+00 |

FIG. 4a is a schematic structural view of an optical system at a wide-angle end according to an implementation. FIG. 4b illustrates a longitudinal spherical aberration curve, an astigmatic field curve, and a distortion curve of the optical system at the wide-angle end of FIG. 4a. As illustrated in FIG. 4b, the optical system illustrated in FIGS. 4a, 4c, and 4e can achieve good imaging quality.

FIG. 4c is a schematic structural view of the optical system at an intermediate according to an implementation. FIG. 4d a longitudinal spherical aberration curve, an astigmatic field curve, and a distortion curve of the optical system at the intermediate of the FIG. 4c. As illustrated in FIG. 4d, the optical system illustrated in FIGS. 4a, 4c, and 4e can achieve good imaging quality.

Figure 4F:
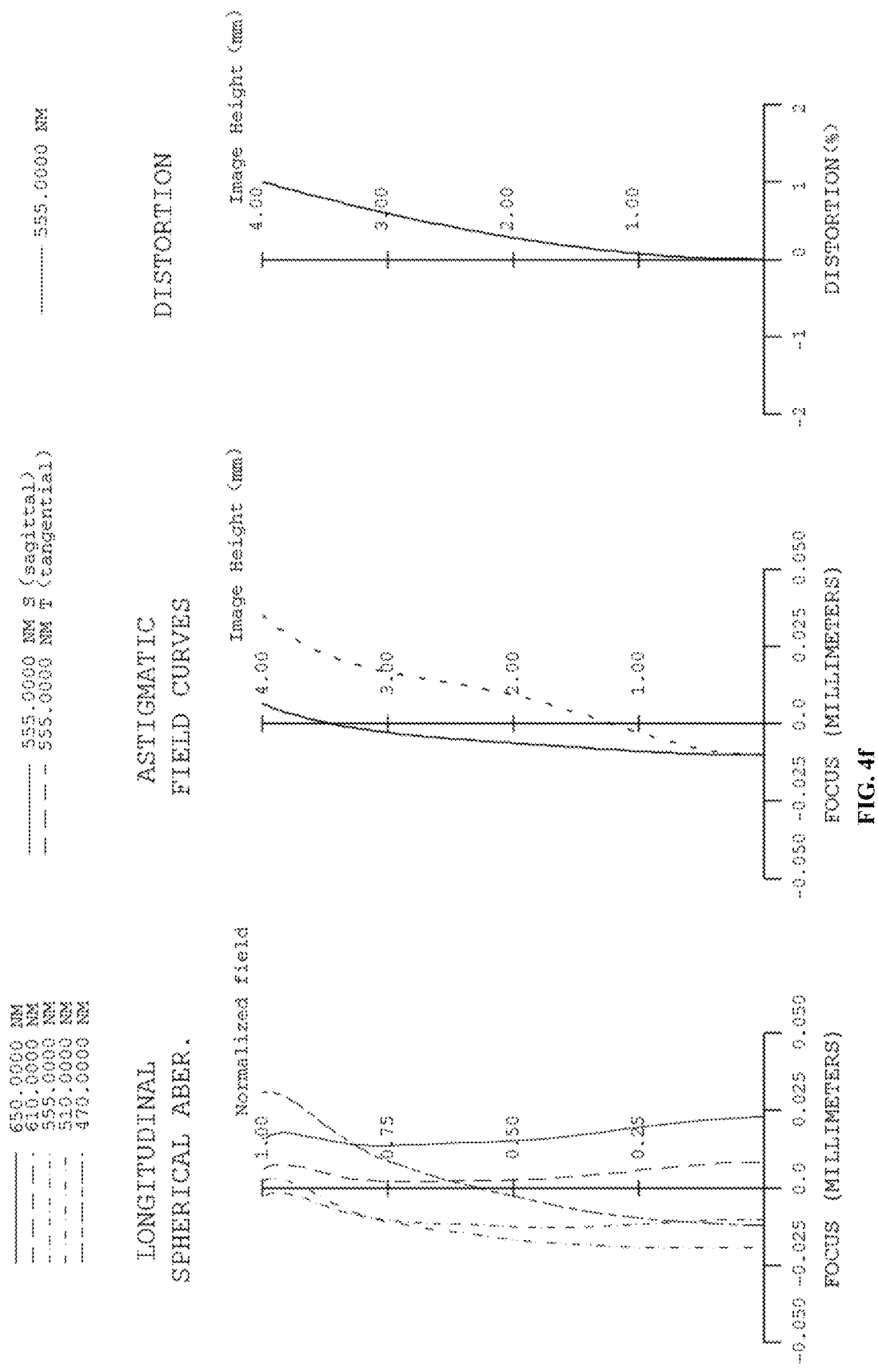
FIG. 4f illustrates a longitudinal spherical aberration curve, an astigmatic field curve, and a distortion curve of the optical system at the telephoto end of FIG. 4e.

FIG. 4e is a schematic structural view of the optical system at a telephoto end according to an implementation. FIG. 4f illustrates a longitudinal spherical aberration curve, an astigmatic field curve, and a distortion curve of the optical system at the telephoto end of FIG. 4e. As illustrated in FIG. 4f, the optical system illustrated in FIGS. 4a, 4c, and 4e can achieve good imaging quality.

Referring to FIGS. 5a to 5f, the optical system in this implementation includes a first lens L1, a second lens L2, a third lens L3, a fourth lens L4, a fifth lens L5, a sixth lens L6, a seventh lens L7, and an eighth lens L8 which are sequentially arranged from the object side to the image side along the optical axis of the optical system.

The first lens L1 has a positive refractive power. The object-side surface S1 of the first lens L1 is convex near the optical axis and is convex at a circumference. The image-side surface S2 of the first lens L1 is concave near the optical axis and is concave at a circumference.

The second lens L2 has a negative refractive power. The object-side surface S3 of the second lens L2 is convex near the optical axis and is convex at a circumference. The image-side surface S4 of the second lens L2 is concave near the optical axis and is concave at a circumference.

The third lens L3 has a negative refractive power. The object-side surface S5 of the third lens L3 is convex near the optical axis and is concave at a circumference. The image-side surface S6 of the third lens L3 is concave near the optical axis and is convex at a circumference.

The fourth lens L4 has a positive refractive power. The object-side surface S7 of the fourth lens L4 is convex near the optical axis and is concave at a circumference. The image-side surface S8 of the fourth lens L4 is convex near the optical axis and is convex at a circumference.

The fifth lens L5 has a positive refractive power. The object-side surface S9 of the fifth lens L5 is convex near the optical axis and is convex at a circumference. The image-side surface S10 of the fifth lens L5 is convex near the optical axis and is convex at a circumference.

The sixth lens L6 has a positive refractive power. The object-side surface S11 of the sixth lens L6 is convex near the optical axis and is convex at a circumference. The image-side surface S12 of the sixth lens L6 is convex near the optical axis and is convex at a circumference.

The seventh lens L7 has a negative refractive power. The object-side surface S13 of the seventh lens L7 is convex near the optical axis and is concave at a circumference. The image-side surface S14 of the seventh lens L7 is concave near the optical axis and is concave at a circumference.

The eighth lens L8 has a positive refractive power. The object-side surface S15 of the eighth lens L8 is concave near the optical axis and is concave at a circumference. The image-side surface S16 of the eighth lens L8 is convex near the optical axis and is convex at a circumference.

Figure 5A:
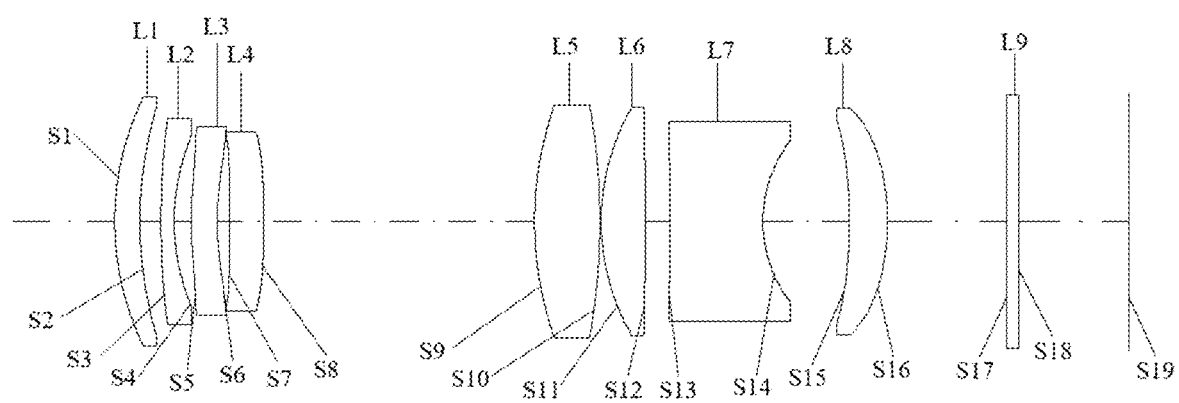
FIG. 5a is a schematic structural view of an optical system at a wide-angle end according to an implementation.
Figure 5B:
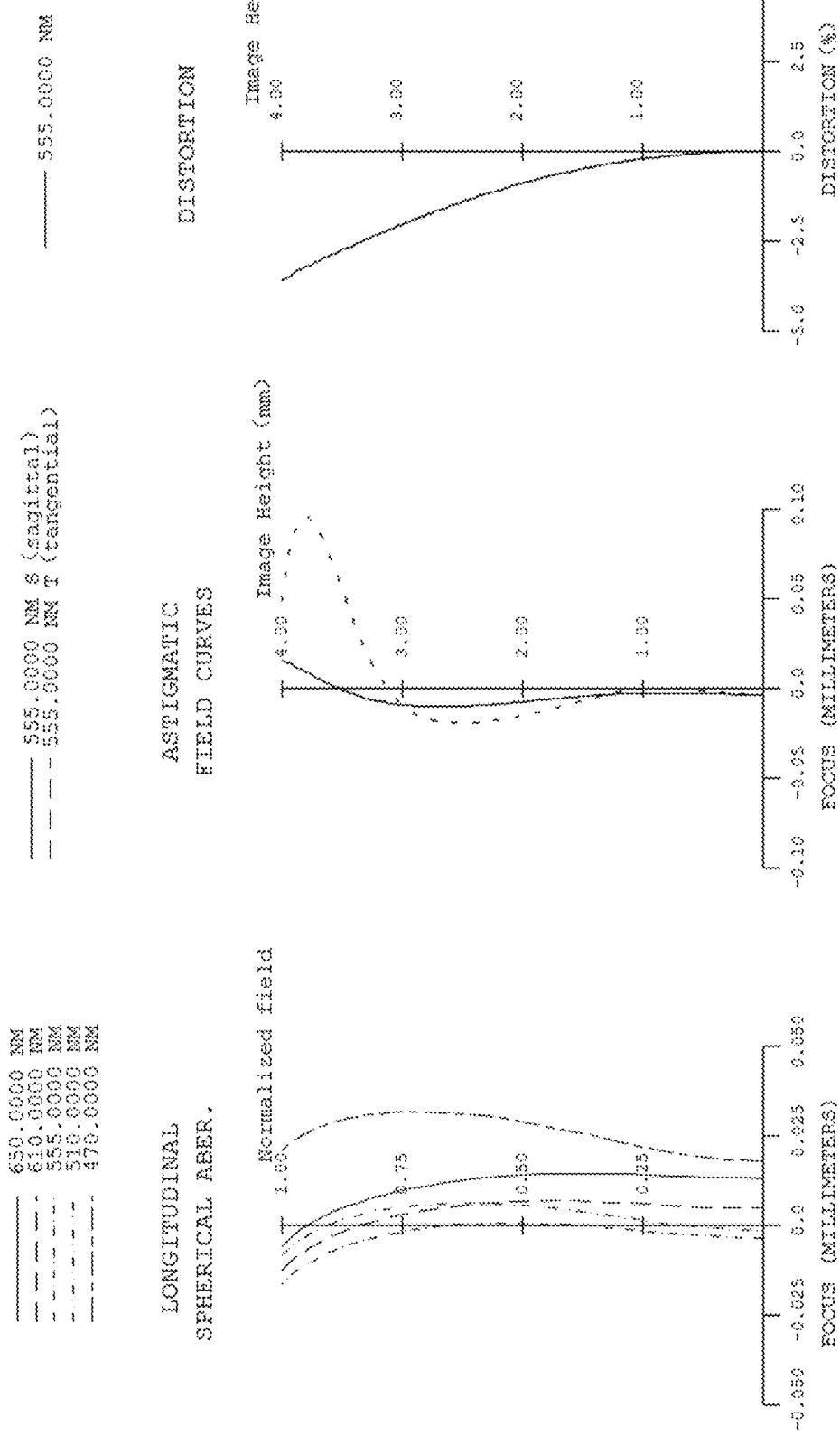
Figure 5C:
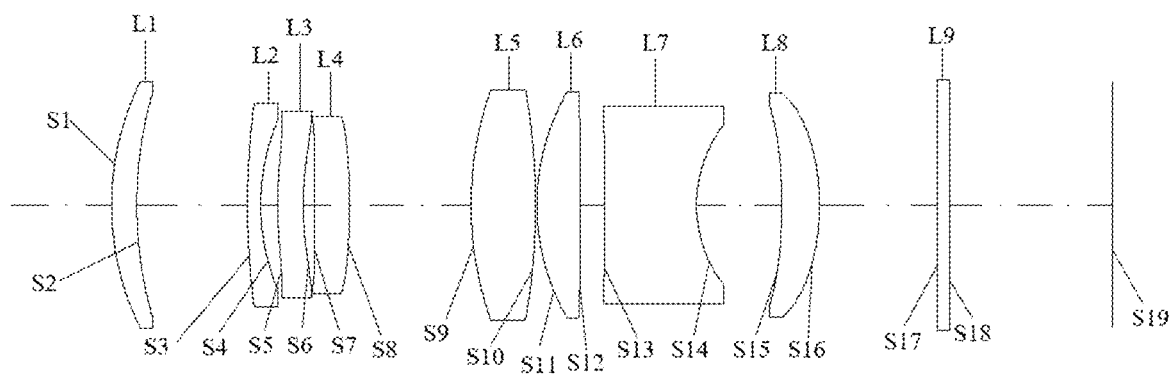
FIG. 5c is a schematic structural view of the optical system at an intermediate according to an implementation.
Figure 5D:
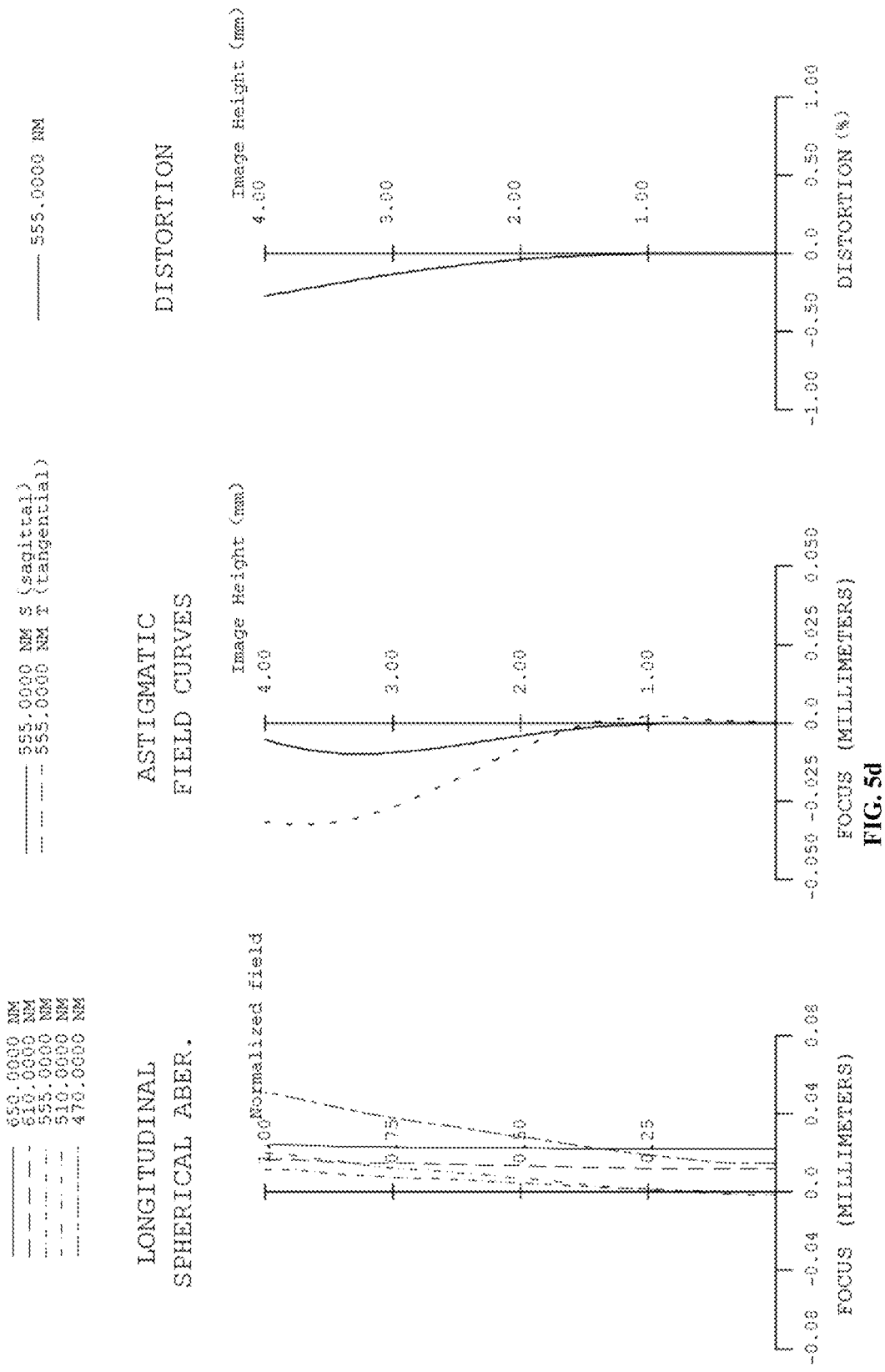
FIG. 5d a longitudinal spherical aberration curve, an astigmatic field curve, and a distortion curve of the optical system at the intermediate of FIG. 5c.
Figure 5E:
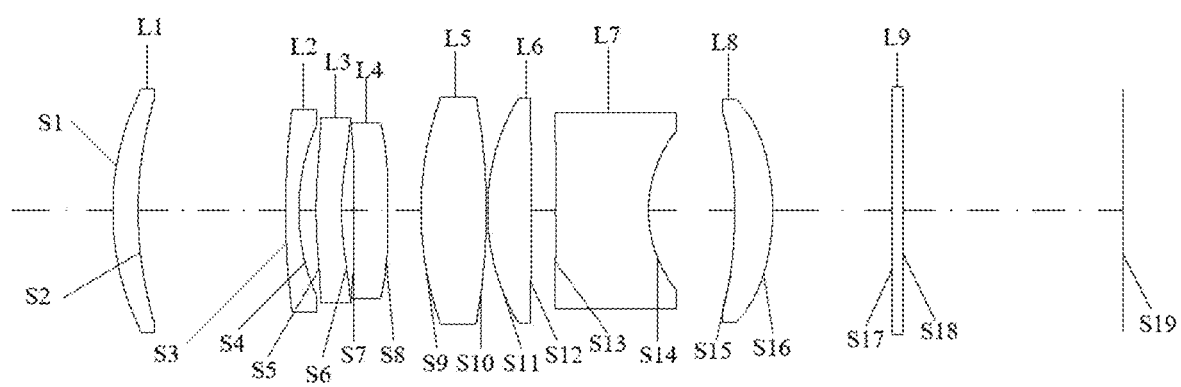
FIG. 5e is a schematic structural view of the optical system at a telephoto end according to an implementation.

The other structures of the optical system illustrated in FIGS. 5a, 5c, and 5e are identical with the optical system illustrated in FIGS. 1a, 1c, and 1e, reference can be made to the optical system illustrated in FIGS. 1a, 1c, and 1e.

TABLE 5a (1)

Optical system illustrated in FIGS. 5a, 5c, and 5e
TTL = 34 mm

| Surface Number | Surface Name | Shape | Y Radius | Thickness | Material | Refractive Index | Abbe Number | Focal Length |
|---|---|---|---|---|---|---|---|---|
| Object surface | Object surface | Spherical | Infinity | Infinity | | | | |
| S1 | first lens | Spherical | 9.2664 | 0.8501 | Glass | 1.487 | 70.40 | 58.484696 |
| S2 | | Spherical | 13.3155 | D1 | | | | |
| S3 | second lens | Spherical | 26.2571 | 0.4467 | Glass | 1.744 | 50.77 | −13.61733 |
| S4 | | Spherical | 7.2595 | 0.5779 | | | | |
| S5 | third lens | Aspherical | 13.6690 | 0.8600 | Plastic | 1.535 | 55.75 | −51.24481 |
| S6 | | Aspherical | 8.9213 | 0.4023 | | | | |
| S7 | fourth lens | Aspherical | 86.4199 | 1.1648 | | | | |
| S8 (stop) | | Aspherical | −35.5088 | D2 | Plastic | 1.671 | 19.24 | 37.633777 |
| S9 | fifth lens | Spherical | 11.4829 | 2.1916 | Plastic | 1.535 | 55.75 | 14.36853 |
| S10 | | Spherical | −21.7082 | 0.0450 | | | | |
| S11 | sixth lens | Spherical | 7.5122 | 1.4793 | Glass | 1.573 | 57.76 | 12.422098 |
| S12 | | Spherical | −123.7983 | 0.8111 | | | | |
| S13 | seventh lens | Aspherical | 322.1252 | 3.1287 | Plastic | 1.671 | 19.24 | −6.647543 |
| S14 | | Aspherical | 4.3845 | 2.8968 | | | | |
| S15 | eighth lens | Aspherical | −16.7198 | 1.2765 | Plastic | 1.671 | 19.24 | 21.391985 |
| S16 | | Aspherical | −7.9624 | 4.0000 | | | | |
| S17 | Infrared cut-off filter | Spherical | Infinity | 0.4000 | Glass | 1.517 | 64.17 | |
| S18 | | Spherical | Infinity | D3 | | | | |
| S19 | Imaging surface | Spherical | Infinity | 0.0000 | | | | |

TABLE 5a (2)

| Variable Distance | D1 | D2 | D3 | f (mm) | FNO | FOV (°) |
|---|---|---|---|---|---|---|
| Telephoto end position | 0.7000 | 9.0700 | 3.7000 | 12.5 | 2.73 | 18.4 |
| Intermediate position | 3.7649 | 4.1379 | 5.5615 | 17.3 | 3.21 | 13.1 |
| Wide-angle position | 4.9601 | 1.1101 | 7.4040 | 21.7 | 3.93 | 10.4 |

Table 5a(1) and Table 5a(2) shows characteristics of the optical system in this implementation. Each of Y radius, thickness, and focal length is in units of millimeter (mm). The focal length is evaluated at a reference wavelength of 555 nm, a refractive index and an Abbe number is evaluated at a reference wavelength of 587.56 nm.

Each parameter in Table 5a(1) and Table 5a(2) represents the same meaning as that in Table 1a(1) and Table 1a(2).

Table 5b shows higher-order coefficients that can be used for each aspherical lens surface of the optical system illustrated in FIGS. 5a, 5c, and 5e, where a shape of each aspherical lens surface can be defined by the formula given in implementations of the optical system illustrated in FIGS. 1a, 1c, and 1e.

TABLE 5b

| Surface Number | K | A4 | A6 | A8 | A10 | A12 | A14 | A16 | A18 | A20 |
|---|---|---|---|---|---|---|---|---|---|---|
| S5 | 5.85E+00 | −2.87E−03 | 2.00E−05 | 0.00E+00 | 0.00E+00 | 0.00E+00 | 0.00E+00 | 0.00E+00 | 0.00E+00 | 0.00E+00 |
| S6 | 2.90E+00 | −3.80E−03 | 1.00E−04 | −1.00E−05 | 0.00E+00 | 0.00E+00 | 0.00E+00 | 0.00E+00 | 0.00E+00 | 0.00E+00 |

TABLE 5b-continued

| Surface Number | K | A4 | A6 | A8 | A10 | A12 | A14 | A16 | A18 | A20 |
|---|---|---|---|---|---|---|---|---|---|---|
| S7 | 7.87E+01 | −1.92E−03 | 6.00E−05 | −1.00E−05 | 0.00E+00 | 0.00E+00 | 0.00E+00 | 0.00E+00 | 0.00E+00 | 0.00E+00 |
| S8 | 2.00E+00 | −1.56E−03 | 2.00E−05 | −1.00E−05 | 0.00E+00 | 0.00E+00 | 0.00E+00 | 0.00E+00 | 0.00E+00 | 0.00E+00 |
| S13 | 0.00E+00 | −6.30E−04 | 1.00E−05 | 0.00E+00 | 0.00E+00 | 0.00E+00 | 0.00E+00 | 0.00E+00 | 0.00E+00 | 0.00E+00 |
| S14 | 0.00E+00 | 2.00E−05 | 0.00E+00 | 0.00E+00 | 0.00E+00 | 0.00E+00 | 0.00E+00 | 0.00E+00 | 0.00E+00 | 0.00E+00 |
| S15 | −8.60E+00 | −4.40E−04 | −3.00E−05 | 0.00E+00 | 0.00E+00 | 0.00E+00 | 0.00E+00 | 0.00E+00 | 0.00E+00 | 0.00E+00 |
| S16 | 2.81E+00 | 2.20E−04 | −2.00E−05 | 0.00E+00 | 0.00E+00 | 0.00E+00 | 0.00E+00 | 0.00E+00 | 0.00E+00 | 0.00E+00 |

FIG. 5a is a schematic structural view of an optical system at a wide-angle end according to an implementation. FIG. 5b illustrates a longitudinal spherical aberration curve, an astigmatic field curve, and a distortion curve of the optical system at the wide-angle end of FIG. 5a. As illustrated in FIG. 5b, the optical system illustrated in FIGS. 5a, 5c, and 5e can achieve good imaging quality.

FIG. 5c is a schematic structural view of the optical system at an intermediate according to an implementation. FIG. 5d a longitudinal spherical aberration curve, an astigmatic field curve, and a distortion curve of the optical system at the intermediate of the FIG. 5c. As illustrated in FIG. 5d, the optical system illustrated in FIGS. 5a, 5c, and 5e can achieve good imaging quality.

Figure 5F:
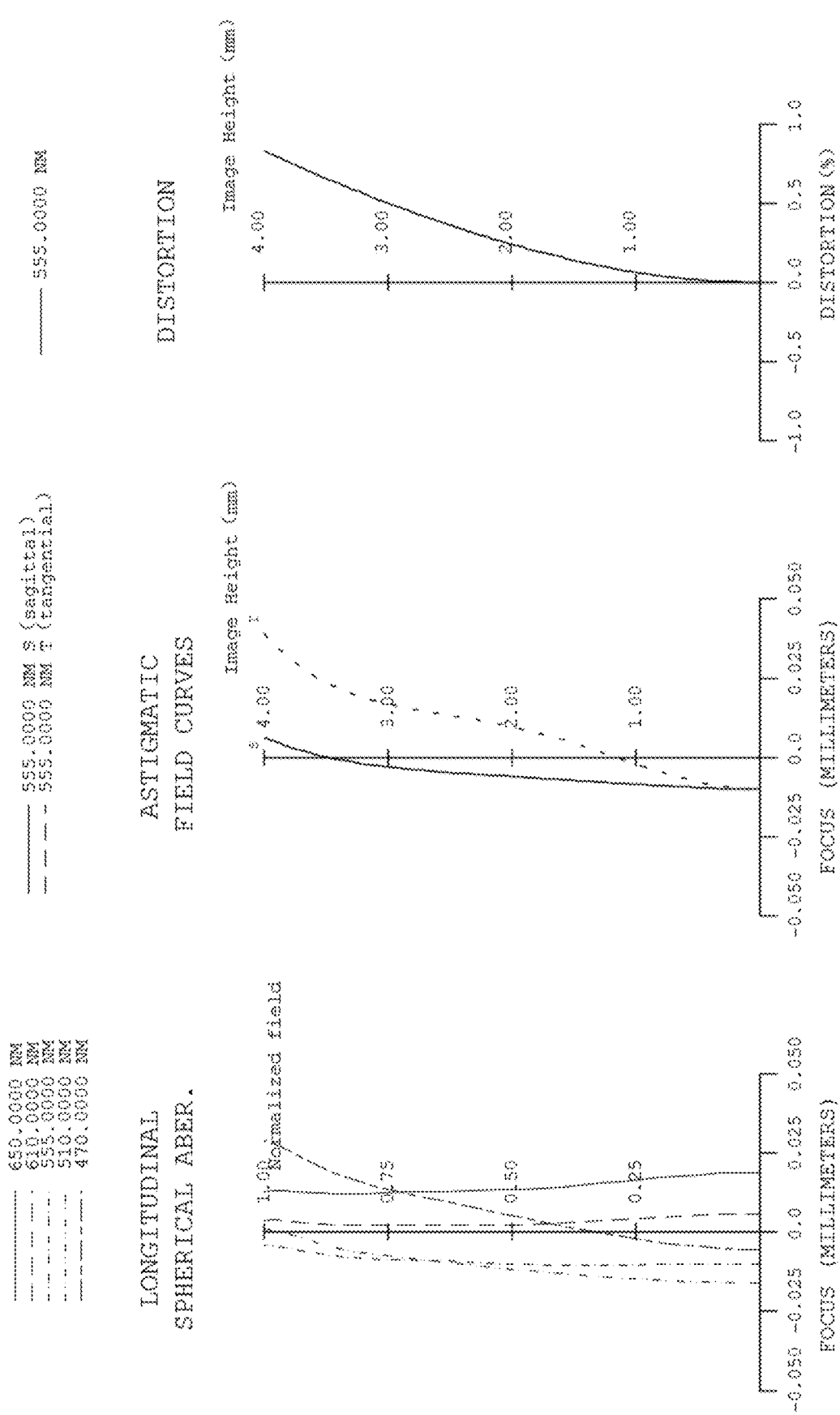
FIG. 5f illustrates a longitudinal spherical aberration curve, an astigmatic field curve, and a distortion curve of the optical system at the telephoto end of FIG. 5e.

FIG. 5e is a schematic structural view of the optical system at a telephoto end according to an implementation. FIG. 5f illustrates a longitudinal spherical aberration curve, an astigmatic field curve, and a distortion curve of the optical system at the telephoto end of FIG. 5e. As illustrated in FIG. 5f, the optical system of the optical system illustrated in FIGS. 5a, 5c, and 5e can achieve good imaging quality.

Table 6 shows values of $fg2/AT24$, $fc/fd$, $TTL/(D1+D2+D3)$, $(g1+g2+g3)/fd$, $FNOc/FNOd$, $fg1/fc$, $fg3/|R15-R16|$, $f3/fg2$, $sdmax/sdmin$, $g2/\Sigma etg2$, $BFc/ImgH$, and $sag82/sag81$ of the optical system illustrated in implementations of the disclosure.

TABLE 6

| | fg2/AT24 | fc/fd | TTL/(D1 + D2 + D3) | (g1 + g2 + g3)/fd | FNOc/ FNOd | fg1/fc |
|---|---|---|---|---|---|---|
| The optical system of FIGS. 1a, 1c, and 1e | −11.14 | 1.56 | 2.54 | 0.84 | 1.29 | 2.39 |
| The optical system of FIGS. 2a, 2c, and 2e | −66.36 | 1.38 | 2.26 | 0.72 | 1.30 | 7.67 |
| The optical system of FIGS. 3a, 3c, and 3e | −14.69 | 2.29 | 2.22 | 0.79 | 1.51 | 1.72 |
| The optical system of FIGS. 4a, 4c, and4e | −12.29 | 1.89 | 2.41 | 0.82 | 1.44 | 2.49 |
| The optical system of FIGS. 5a. 5c, and 5e | −15.50 | 1.74 | 2.52 | 0.88 | 1.44 | 2.69 |

| | fg3/|R15 − R16| | f3/fg2 | sdmax/ sdmin | g2/Σetg2 | BFc/ImgH | sag82/ sag81 |
|---|---|---|---|---|---|---|
| The optical system of FIGS. 1a, 1c, and 1e | 1.16 | 4.07 | 1.50 | 1.70 | 2.70 | 3.49 |
| The optical system of FIGS. 2a, 2c, and 2e | 1.12 | 1.02 | 1.49 | 0.85 | 3.00 | 2.64 |
| The optical system of FIGS. 3a, 3c, and 3e | 0.89 | 4.82 | 1.52 | 1.29 | 3.28 | 2.90 |
| The optical system of FIGS. 4a, 4c, and4e | 1.12 | 3.90 | 1.49 | 1.37 | 3.11 | 2.92 |
| The optical system of FIGS. 5a. 5c, and 5e | 1.33 | 3.37 | 1.49 | 1.24 | 2.95 | 2.55 |

As illustrated in Table 6, each implementation of the disclosure satisfies the following expressions. $-70 < fg2/AT24 < -10$, $fc/fd > 1.3$, $TTL/(D1+D2+D3) < 2.6$, $(g1+g2+g3)/fd < 0.9$, $FNOc/FNOd < 1.6$, $1 < fg1/fc < 8$, $0.8 < fg3/|R15-R16| < 1.5$, $1 < f3/fg2 < 5$, $sdmax/sdmin < 1.55$, $1.2 < g2/\Sigma etg2 < 1.8$, $BFc/ImgH < 3.5$, and $2.5 < sag82/sag81 < 3.5$.

Various technical features of the above implementations can be combined arbitrarily. For the sake of convenience, not all possible combinations of the various technical features in the above implementations are described. However, as long as there is no contradiction in the combinations of these technical features, it should be considered to fall within the scope of the present disclosure.

While the present disclosure has been described specifically and in detail above with reference to several implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. An optical system, comprising a first lens group having a positive refractive power, a second lens group having a negative refractive power, and a third lens group having a positive refractive power which are sequentially arranged from an object side to an image side along an optical axis of the optical system, wherein the first lens group comprises a first lens;

the second lens group comprises a second lens, a third lens, and a fourth lens; and the third lens group comprises a fifth lens, a sixth lens, a seventh lens, and an eighth lens;

a distance between any two groups of the first lens group, the second lens group, and the third lens group is adjustable such that the optical system is operable to be at a telephoto end, an intermediate, and a wide-angle end;

the optical system has different focal lengths at the telephoto end, the intermediate, and the wide-angle end; and the optical system satisfies the following expression:

$-70<fg2/AT24<-10;$ wherein fg2 represents a focal length of the second lens group, AT24 represents a sum of an air space along the optical axis between adjacent lenses in the second lens group.

2. The optical system of claim 1, wherein the optical system satisfies the following expression:

fc/fd>1.3, wherein fc represents the focal length of the optical system at the telephoto end, and fd represents the focal length of the optical system at the wide-angle end.

3. The optical system of claim 1, further comprising a filter placed between the eighth lens and an imaging plane, and the optical system satisfies the following expression:

$TTL/(D1+D2+D3)<2.6;$ wherein TTL represents a distance along the optical axis from an object-side surface of the first lens to the imaging plane of the optical system, D1 represents a distance along the optical axis from the object-side surface of the first lens to an image-side surface of the second lens, D2 represents a distance along the optical axis from an image-side surface of the fourth lens to an object-side surface of the fifth lens, and D3 represents a distance along the optical axis from an image-side surface of the filter to the imaging plane.

4. The optical system of claim 1, wherein the optical system satisfies the following expression:

$(g1+g2+g3)/fd<0.9;$ wherein g1 represents a distance along the optical axis from an object-side surface of the first lens to an image-side surface of the first lens, g2 represents a distance along the optical axis from an object-side surface of the second lens to an image-side surface of the fourth lens, g3 represents a distance along the optical axis from an object-side surface of the fifth lens to an image-side surface of the seventh lens, and fd represents the focal length of the optical system at the wide-angle end.

5. The optical system of claim 1, wherein the optical system satisfies the following expression:

FNOc/FNOd<1.6;

wherein FNOc represents an F-number of the optical system at the telephoto end, and FNOd is the F-number of the optical system at the wide-angle end.

6. The optical system of claim 1, wherein the optical system satisfies the following expression:

$1<fg1/fc<8;$ wherein fg1 represents a focal length of the first lens group, and fc represents the focal length of the optical system at the telephoto end.

7. The optical system of claim 1, wherein the optical system satisfies the following expression:

$0.8<fg3/|R15-R16|<1.5;$ wherein fg3 represents a focal length of the third lens group, R15 represents a curvature radius along the optical axis of an object-side surface of the eighth lens, R16 is a curvature radius along the optical axis of an image-side surface of the eighth lens.

8. The optical system of claim 1, wherein the optical system satisfies the following expression:

$1<f3/fg2<5;$ wherein f3 represents a focal length of the third lens, and fg2 represents the focal length of the second lens group.

9. The optical system of claim 1, wherein the optical system satisfies the following expression:

$sdmax/sdmin<1.55;$ wherein sdmax represents a maximum value of maximum effective radiuses of an object-side surface and an image-side surface of each one of the first to eighth lenses, and sdmin represents a minimum value of maximum effective radiuses of the object-side surface and the image-side surface of each one of the first to eighth lenses.

10. The optical system of claim 1, wherein the optical system satisfies the following expression:

$1.2<g2/\Sigma etg2<1.8;$ wherein g2 represents a distance along the optical axis from an object-side surface of the second lens to an image-side surface of the fourth lens, and Σ etg2 represents a sum of an edge thickness of each lens element in the second lens group.

11. The optical system of claim 1, wherein the optical system satisfies the following expression:

$BFc/ImgH<3.5;$ wherein BFc represents a minimum distance along the optical axis from an image-side surface of the eighth lens to an imaging plane when the optical system is at the telephoto end, and ImgH represents half of a diagonal length of an effective pixel region of the imaging plane.

12. The optical system of claim 1, wherein the optical system satisfies the following expression:

$2.5<sag82/sag81<3.5;$ wherein sag81 represents a sag at a maximum effective radius of an object-side surface of the eighth lens, and sag82 represents a sag at a maximum effective radius of an image-side surface of the eighth lens.

13. A camera module, comprising a lens barrel, an electronic photosensitive element, and an optical system, wherein the optical system comprises a first lens group having a positive refractive power, a second lens group having a negative refractive power, and a third lens group having a positive refractive power which are sequentially arranged from an object side to an image side along an optical axis of the optical system, wherein the first lens group comprises a first lens;

the second lens group comprises a second lens, a third lens, and a fourth lens; and the third lens group comprises a fifth lens, a sixth lens, a seventh lens, and an eighth lens;

a distance between the first lens group, the second lens group, and the third lens group is adjustable such that the optical system is operable to be at a telephoto end, an intermediate, and a wide-angle end;

the optical system has different focal lengths at the telephoto end, the intermediate, and the wide-angle end; and the optical system satisfies the following expression:

$$-70 < fg2/AT24 < -10;$$

wherein fg2 represents a focal length of the second lens group, AT24 represents a sum of an air space along the optical axis between adjacent lenses in the second lens group; and the first to eighth lenses of the optical system are mounted in the lens barrel, and the electronic photosensitive element is disposed at the image side of the optical system.

14. The camera module of claim 13, wherein the optical system satisfies the following expression:

fc/fd>1.3, wherein fc represents the focal length of the optical system at the telephoto end, and fd represents the focal length of the optical system at the wide-angle end.

15. The camera module of claim 13, further comprising a filter placed between the eighth lens and an imaging plane, and the optical system satisfies the following expression:

$$TTL/(D1+D2+D3)<2.6;$$

wherein TTL represents a distance along the optical axis from an object-side surface of the first lens to the imaging plane of the optical system, D1 represents a distance along the optical axis from the object-side surface of the first lens to an image-side surface of the second lens, D2 represents a distance along the optical axis from an image-side surface of the fourth lens to an object-side surface of the fifth lens, and D3 represents a distance along the optical axis from an image-side surface of the filter to the imaging plane.

16. The camera module of claim 13, wherein the optical system satisfies the following expression:

$$(g1+g2+g3)/fd<0.9;$$

wherein g1 represents a distance along the optical axis from an object-side surface of the first lens to an image-side surface of the first lens, g2 represents a distance along the optical axis from an object-side surface of the second lens to an image-side surface of the fourth lens, g3 represents a distance along the optical axis from an object-side surface of the fifth lens to an image-side surface of the seventh lens, and fd represents the focal length of the optical system at the wide-angle end.

17. The camera module of claim 13, wherein the optical system satisfies the following expression:

FNOc/FNOd<1.6;

wherein FNOc represents an F-number of the optical system at the telephoto end, and FNOd is the F-number of the optical system at the wide-angle end.

18. The camera module of claim 13, wherein the optical system satisfies the following expression:

$$1<fg1/fc<8;$$

wherein fg1 represents a focal length of the first lens group, and fc represents the focal length of the optical system at the telephoto end.

19. The camera module of claim 13, wherein the optical system satisfies the following expression:

$$0.8<fg3/|R15-R16|<1.5;$$

wherein fg3 represents a focal length of the third lens group, R15 represents a curvature radius along the optical axis of an object-side surface of the eighth lens, R16 is a curvature radius along the optical axis of an image-side surface of the eighth lens.

20. An electronic device, comprising a housing and the camera module of claim 13, and the camera module is received in the housing.

\* \* \* \* \*